US008370366B2

(12) United States Patent
Adams et al.

(10) Patent No.: US 8,370,366 B2
(45) Date of Patent: Feb. 5, 2013

(54) METHOD AND SYSTEM FOR COMPARING ATTRIBUTES SUCH AS BUSINESS NAMES

(75) Inventors: Norm Adams, Cave Creek, AZ (US); Scott Ellard, Marietta, GA (US); Scott Schumacher, Northridge, CA (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/687,324

(22) Filed: Jan. 14, 2010

(65) Prior Publication Data
US 2010/0174725 A1 Jul. 8, 2010

Related U.S. Application Data

(63) Continuation of application No. 11/521,928, filed on Sep. 15, 2006, now Pat. No. 7,685,093.

(51) Int. Cl.
G06F 17/30 (2006.01)
(52) U.S. Cl. ........................ 707/749; 707/716; 707/750
(58) Field of Classification Search ................. 707/748, 707/726, 749; 705/323; 719/330
See application file for complete search history.

(56) References Cited

U.S. PATENT DOCUMENTS

| | | |
|---|---|---|
| 4,531,186 A | 7/1985 | Knapman |
| 5,020,019 A | 5/1991 | Ogawa |
| 5,134,564 A | 7/1992 | Dunn et al. |
| 5,247,437 A | 9/1993 | Vale et al. |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo |
| 5,535,322 A | 7/1996 | Hecht |
| 5,535,382 A | 7/1996 | Ogawa |
| 5,537,590 A | 7/1996 | Amado |
| 5,555,409 A | 9/1996 | Leenstra et al. |
| 5,561,794 A | 10/1996 | Fortier |
| 5,583,763 A | 12/1996 | Atcheson et al. |
| 5,600,835 A | 2/1997 | Garland et al. |
| 5,606,690 A | 2/1997 | Hunter et al. |
| 5,615,367 A | 3/1997 | Bennett et al. |
| 5,640,553 A | 6/1997 | Schultz |
| 5,651,108 A | 7/1997 | Cain et al. |

(Continued)

FOREIGN PATENT DOCUMENTS

| | | |
|---|---|---|
| WO | 9855947 A1 | 12/1998 |
| WO | 0159586 | 8/2001 |

(Continued)

OTHER PUBLICATIONS

Microsoft Dictionary, Sep. 8, 2008, Microsoft Corp, "normalize", fifth edition,at p. 4, downloaded from safaribooks, pp. 1-4.*

(Continued)

Primary Examiner — Shahid Alam

(57) ABSTRACT

Embodiments of systems and methods for comparing attributes of a data record are presented herein. Broadly speaking, embodiments of the present invention generate a weight based on a comparison of the name (or other) attributes of data records. More particularly, embodiments of the present invention generate a weight based on a comparison of name attributes. More specifically, embodiments of the present invention may calculate an information score for each of two name attributes to be compared to get an average information score for the two name attributes. The two name attributes may then be compared against one another to generate a weight between the two attributes. This weight can then be normalized to generate a final weight between the two business name attributes.

24 Claims, 9 Drawing Sheets

U.S. PATENT DOCUMENTS

| | | | |
|---|---|---|---|
| 5,675,752 A | 10/1997 | Scott et al. |
| 5,675,753 A | 10/1997 | Hansen et al. |
| 5,694,593 A | 12/1997 | Baclawski |
| 5,694,594 A | 12/1997 | Chang |
| 5,710,916 A | 1/1998 | Barbara et al. |
| 5,734,907 A | 3/1998 | Jarossay et al. |
| 5,765,150 A | 6/1998 | Burrows |
| 5,774,661 A | 6/1998 | Chatterjee |
| 5,774,883 A | 6/1998 | Andersen |
| 5,774,887 A | 6/1998 | Wolff et al. |
| 5,778,370 A | 7/1998 | Emerson |
| 5,787,431 A | 7/1998 | Shaughnessy |
| 5,787,470 A | 7/1998 | DeSimone et al. |
| 5,790,173 A | 8/1998 | Strauss |
| 5,796,393 A | 8/1998 | MacNaughton et al. |
| 5,805,702 A | 9/1998 | Curry |
| 5,809,499 A | 9/1998 | Wong et al. |
| 5,819,264 A | 10/1998 | Palmon et al. |
| 5,835,712 A | 11/1998 | DuFresne |
| 5,835,912 A | 11/1998 | Pet |
| 5,848,271 A | 12/1998 | Caruso et al. |
| 5,859,972 A | 1/1999 | Subramaniam et al. |
| 5,862,322 A | 1/1999 | Anglin et al. |
| 5,862,325 A | 1/1999 | Reed et al. |
| 5,878,043 A | 3/1999 | Casey |
| 5,893,074 A | 4/1999 | Hughes et al. |
| 5,893,110 A | 4/1999 | Weber et al. |
| 5,905,496 A | 5/1999 | Lau et al. |
| 5,930,768 A | 7/1999 | Hooban |
| 5,960,411 A | 9/1999 | Hartman et al. |
| 5,963,915 A | 10/1999 | Kirsch |
| 5,987,422 A | 11/1999 | Buzsaki |
| 5,991,758 A | 11/1999 | Ellard |
| 5,999,937 A | 12/1999 | Ellard |
| 6,014,664 A | 1/2000 | Fagin et al. |
| 6,016,489 A | 1/2000 | Cavanaugh et al. |
| 6,018,733 A | 1/2000 | Kirsch et al. |
| 6,018,742 A | 1/2000 | Herbert, III |
| 6,026,433 A | 2/2000 | D'Arlach et al. |
| 6,049,847 A | 4/2000 | Vogt et al. |
| 6,067,549 A | 5/2000 | Smalley et al. |
| 6,069,628 A | 5/2000 | Farry et al. |
| 6,078,325 A | 6/2000 | Jolissaint et al. |
| 6,108,004 A | 8/2000 | Medl |
| 6,134,581 A | 10/2000 | Ismael et al. |
| 6,185,608 B1 | 2/2001 | Hon et al. |
| 6,223,145 B1 | 4/2001 | Hearst |
| 6,269,373 B1 | 7/2001 | Apte et al. |
| 6,297,824 B1 | 10/2001 | Hearst et al. |
| 6,298,478 B1 | 10/2001 | Nally et al. |
| 6,311,190 B1 | 10/2001 | Bayer et al. |
| 6,327,611 B1 | 12/2001 | Everingham |
| 6,330,569 B1 | 12/2001 | Baisley et al. |
| 6,356,931 B2 | 3/2002 | Ismael et al. |
| 6,374,241 B1 | 4/2002 | Lamburt et al. |
| 6,385,600 B1 | 5/2002 | McGuinness et al. |
| 6,389,429 B1 | 5/2002 | Kane et al. |
| 6,446,188 B1 | 9/2002 | Henderson et al. |
| 6,449,620 B1 | 9/2002 | Draper |
| 6,457,065 B1 | 9/2002 | Rich et al. |
| 6,460,045 B1 | 10/2002 | Aboulnaga et al. |
| 6,496,793 B1 | 12/2002 | Veditz et al. |
| 6,502,099 B1 | 12/2002 | Rampy et al. |
| 6,510,505 B1 | 1/2003 | Burns et al. |
| 6,523,019 B1 | 2/2003 | Borthwick |
| 6,529,888 B1 | 3/2003 | Heckerman et al. |
| 6,556,983 B1 | 4/2003 | Altschuler et al. |
| 6,557,100 B1 | 4/2003 | Knutson |
| 6,621,505 B1 | 9/2003 | Beauchamp et al. |
| 6,633,878 B1 | 10/2003 | Underwood |
| 6,633,882 B1 | 10/2003 | Fayyad et al. |
| 6,633,992 B1 | 10/2003 | Rosen |
| 6,647,383 B1 | 11/2003 | August et al. |
| 6,662,180 B1 | 12/2003 | Aref et al. |
| 6,687,702 B2 | 2/2004 | Vaitheeswaran et al. |
| 6,704,805 B1 | 3/2004 | Acker et al. |
| 6,718,535 B1 | 4/2004 | Underwood |
| 6,742,003 B2 | 5/2004 | Heckerman et al. |
| 6,757,708 B1 | 6/2004 | Craig et al. |
| 6,795,793 B2 | 9/2004 | Shayegan et al. |
| 6,807,537 B1 | 10/2004 | Thiesson et al. |
| 6,842,761 B2 | 1/2005 | Diamond et al. |
| 6,842,906 B1 | 1/2005 | Bowman-Amuah |
| 6,879,944 B1 | 4/2005 | Tipping et al. |
| 6,907,422 B1 | 6/2005 | Predovic |
| 6,912,549 B2 | 6/2005 | Rotter et al. |
| 6,922,695 B2 | 7/2005 | Skufca et al. |
| 6,957,186 B1 | 10/2005 | Guheen et al. |
| 6,990,636 B2 | 1/2006 | Beauchamp et al. |
| 6,996,565 B2 | 2/2006 | Skufca et al. |
| 7,035,809 B2 | 4/2006 | Miller et al. |
| 7,043,476 B2 | 5/2006 | Robson |
| 7,099,857 B2 | 8/2006 | Lambert |
| 7,143,091 B2 | 11/2006 | Charnock et al. |
| 7,155,427 B1 | 12/2006 | Prothia |
| 7,181,459 B2 | 2/2007 | Grant et al. |
| 7,249,131 B2 | 7/2007 | Skufca et al. |
| 7,330,845 B2 | 2/2008 | Lee et al. |
| 7,487,173 B2 | 2/2009 | Medicke et al. |
| 7,526,486 B2 | 4/2009 | Cushman, II et al. |
| 7,567,962 B2 | 7/2009 | Chakrabarti et al. |
| 7,620,647 B2 | 11/2009 | Stephens et al. |
| 7,627,550 B1 | 12/2009 | Adams et al. |
| 7,685,093 B1 | 3/2010 | Adams et al. |
| 7,698,268 B1 | 4/2010 | Adams et al. |
| 7,788,274 B1 | 8/2010 | Ionescu |
| 8,321,383 B2 | 11/2012 | Schumacher et al. |
| 8,321,393 B2 | 11/2012 | Adams et al. |
| 2002/0007284 A1 | 1/2002 | Schurenberg et al. |
| 2002/0073099 A1 | 6/2002 | Gilbert et al. |
| 2002/0080187 A1 | 6/2002 | Lawton |
| 2002/0087599 A1 | 7/2002 | Grant et al. |
| 2002/0095421 A1 | 7/2002 | Koskas |
| 2002/0099694 A1 | 7/2002 | Diamond et al. |
| 2002/0152422 A1 | 10/2002 | Sharma et al. |
| 2002/0156917 A1 | 10/2002 | Nye |
| 2002/0178360 A1 | 11/2002 | Wenocur et al. |
| 2003/0004770 A1 | 1/2003 | Miller et al. |
| 2003/0004771 A1 | 1/2003 | Yaung |
| 2003/0018652 A1 | 1/2003 | Heckerman et al. |
| 2003/0023773 A1 | 1/2003 | Lee et al. |
| 2003/0051063 A1 | 3/2003 | Skufca et al. |
| 2003/0065826 A1 | 4/2003 | Skufca et al. |
| 2003/0065827 A1 | 4/2003 | Shufca et al. |
| 2003/0105825 A1 | 6/2003 | Kring et al. |
| 2003/0120630 A1 | 6/2003 | Tunkelang |
| 2003/0145002 A1 | 7/2003 | Kleinberger et al. |
| 2003/0158850 A1 | 8/2003 | Lawrence et al. |
| 2003/0174179 A1 | 9/2003 | Suermondt et al. |
| 2003/0182101 A1 | 9/2003 | Lambert |
| 2003/0182310 A1 | 9/2003 | Charnock et al. |
| 2003/0195836 A1 | 10/2003 | Hayes et al. |
| 2003/0195889 A1 | 10/2003 | Yao et al. |
| 2003/0195890 A1 | 10/2003 | Oommen |
| 2003/0220858 A1 | 11/2003 | Lam et al. |
| 2003/0227487 A1 | 12/2003 | Hugh |
| 2004/0107189 A1 | 6/2004 | Burdick et al. |
| 2004/0107205 A1 | 6/2004 | Burdick et al. |
| 2004/0122790 A1 | 6/2004 | Walker et al. |
| 2004/0143477 A1 | 7/2004 | Wolff |
| 2004/0143508 A1 | 7/2004 | Bohn et al. |
| 2004/0181526 A1 | 9/2004 | Burdick et al. |
| 2004/0181554 A1 | 9/2004 | Heckerman et al. |
| 2004/0220926 A1 | 11/2004 | Lamkin et al. |
| 2004/0260694 A1 | 12/2004 | Chaudhuri et al. |
| 2005/0004895 A1 | 1/2005 | Schurenberg et al. |
| 2005/0015381 A1 | 1/2005 | Clifford et al. |
| 2005/0015675 A1 | 1/2005 | Kolawa et al. |
| 2005/0050068 A1 | 3/2005 | Vaschillo et al. |
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1 | 4/2005 | Flores et al. |
| 2005/0114369 A1 | 5/2005 | Gould et al. |
| 2005/0149522 A1 | 7/2005 | Cookson et al. |

| | | | |
|---|---|---|---|
| 2005/0154615 A1 | 7/2005 | Rotter et al. | |
| 2005/0210007 A1 | 9/2005 | Beres et al. | |
| 2005/0228808 A1 | 10/2005 | Mamou et al. | |
| 2005/0240392 A1 | 10/2005 | Munro et al. | |
| 2005/0256740 A1 | 11/2005 | Kohan et al. | |
| 2005/0256882 A1 | 11/2005 | Able et al. | |
| 2005/0273452 A1 | 12/2005 | Molloy et al. | |
| 2006/0053151 A1 | 3/2006 | Gardner et al. | |
| 2006/0053172 A1 | 3/2006 | Gardner et al. | |
| 2006/0053173 A1 | 3/2006 | Gardner et al. | |
| 2006/0053382 A1 | 3/2006 | Gardner et al. | |
| 2006/0064429 A1 | 3/2006 | Yao | |
| 2006/0074832 A1 | 4/2006 | Gardner et al. | |
| 2006/0074836 A1 | 4/2006 | Gardner et al. | |
| 2006/0080312 A1 | 4/2006 | Friedlander et al. | |
| 2006/0116983 A1 | 6/2006 | Dettinger et al. | |
| 2006/0117032 A1 | 6/2006 | Dettinger et al. | |
| 2006/0129605 A1 | 6/2006 | Doshi | |
| 2006/0129971 A1 | 6/2006 | Rojer | |
| 2006/0136205 A1 | 6/2006 | Song | |
| 2006/0161522 A1 | 7/2006 | Dettinger et al. | |
| 2006/0167896 A1 | 7/2006 | Kapur et al. | |
| 2006/0179050 A1 | 8/2006 | Giang et al. | |
| 2006/0190445 A1 | 8/2006 | Risberg et al. | |
| 2006/0195560 A1 | 8/2006 | Newport | |
| 2006/0265400 A1 | 11/2006 | Fain et al. | |
| 2006/0271401 A1 | 11/2006 | Lassetter et al. | |
| 2006/0271549 A1 | 11/2006 | Rayback et al. | |
| 2006/0287890 A1 | 12/2006 | Stead et al. | |
| 2007/0005567 A1 | 1/2007 | Hermansen et al. | |
| 2007/0016450 A1 | 1/2007 | Bhora et al. | |
| 2007/0055647 A1 | 3/2007 | Mullins et al. | |
| 2007/0067285 A1 | 3/2007 | Blume et al. | |
| 2007/0073678 A1 | 3/2007 | Scott et al. | |
| 2007/0073745 A1 | 3/2007 | Scott et al. | |
| 2007/0094060 A1 | 4/2007 | Apps et al. | |
| 2007/0150279 A1* | 6/2007 | Gandhi et al. | 704/258 |
| 2007/0192715 A1 | 8/2007 | Kataria et al. | |
| 2007/0198481 A1 | 8/2007 | Hogue et al. | |
| 2007/0198600 A1 | 8/2007 | Betz | |
| 2007/0214129 A1 | 9/2007 | Ture et al. | |
| 2007/0214179 A1 | 9/2007 | Hoang | |
| 2007/0217676 A1 | 9/2007 | Grauman et al. | |
| 2007/0250487 A1 | 10/2007 | Reuther | |
| 2007/0260492 A1 | 11/2007 | Feied et al. | |
| 2007/0276844 A1 | 11/2007 | Segal et al. | |
| 2007/0276858 A1 | 11/2007 | Cushman et al. | |
| 2007/0299697 A1 | 12/2007 | Friedlander et al. | |
| 2007/0299842 A1 | 12/2007 | Morris et al. | |
| 2008/0005106 A1 | 1/2008 | Schumacher et al. | |
| 2008/0016218 A1 | 1/2008 | Jones et al. | |
| 2008/0069132 A1 | 3/2008 | Ellard et al. | |
| 2008/0120432 A1 | 5/2008 | Lamoureux et al. | |
| 2008/0126160 A1 | 5/2008 | Takuechi et al. | |
| 2008/0243832 A1 | 10/2008 | Adams et al. | |
| 2008/0243885 A1 | 10/2008 | Harger et al. | |
| 2008/0244008 A1 | 10/2008 | Wilkinson et al. | |
| 2009/0089317 A1 | 4/2009 | Ford et al. | |
| 2009/0089332 A1 | 4/2009 | Harger et al. | |
| 2009/0089630 A1 | 4/2009 | Goldenberg et al. | |
| 2009/0198686 A1 | 8/2009 | Cushman, II et al. | |
| 2010/0114877 A1 | 5/2010 | Adams et al. | |
| 2010/0174725 A1 | 7/2010 | Adams et al. | |
| 2010/0175024 A1 | 7/2010 | Schumacher et al. | |
| 2011/0010214 A1 | 1/2011 | Carruth | |
| 2011/0010346 A1 | 1/2011 | Goldenberg et al. | |
| 2011/0010401 A1 | 1/2011 | Adams et al. | |
| 2011/0010728 A1 | 1/2011 | Goldenberg et al. | |
| 2011/0047044 A1 | 2/2011 | Wright et al. | |
| 2011/0191349 A1 | 8/2011 | Ford et al. | |

FOREIGN PATENT DOCUMENTS

| | | |
|---|---|---|
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

Fair, "Record Linkage in the National Dose Registry of Canada", European Journal of Cancer, vol. 3, Supp. 3, pp. S37-S43, XP005058648 ISSN: 0959-8049, Apr. 1997.

International Search Report and Written Opinion, for PCT/US2007/012073, Mailed Jul. 23, 2008, 12 pages.

International Preliminary Report on Patentability Issued in PCT/US2007/013049, Mailed Dec. 17, 2008.

International Search Report and Written Opinion issued in PCT/US2007/013049, mailed Jun. 13, 2008.

Office Action issued in U.S. Appl. No. 11/809,792, mailed Aug. 21, 2009, 14 pages.

Oracle Data Hubs: "The Emperor Has No Clothes?", Feb. 21, 2005, Google.com, pp. 1-9.

IEEE, no matched results, Jun. 30, 2009, p. 1.

IEEE No matched Results, 1 Page, Sep. 11, 2009.

Office Action issued in U.S. Appl. No. 11/522,223 dated Aug. 20, 2008, 16 pgs.

Office Action issued in U.S. Appl. No. 11/522,223 dated Feb. 5, 2009, Adams, 17 pages.

Notice of Allowance issued for U.S. Appl. No. 11/522,223, dated Sep. 17, 2009, 20 pages.

De Rose, et al. "Building Structured Web Community Portals: A Top-Down, Compositional, and Incremental Approach", VDLB, ACM, pp. 399-410, Sep. 2007.

Microsoft Dictionary, "normalize", at p. 20, Fifth Edition, Microsoft Corp., downloaded from http://proquest.safaribooksonline.com/0735614954 on Sep. 8, 2008.

Office Action issued in U.S. Appl. No. 11/521,928 dated Apr. 1, 2009, 22 pages.

Office Action issued in U.S. Appl. No. 11/521,928 dated Sep. 16, 2008, 14 pages.

Notice of Allowance issued for U.S. Appl. No. 11/521,928, dated Sep. 18, 2009, 20 pages.

Gopalan Suresh Raj, Modeling Using Session and Entity Beans, Dec. 1998, Web Cornucopia, pp. 1-15.

Scott W. Ambler, Overcoming Data Design Challenges, Aug. 2001, p. 1-3.

XML, JAVA, and the future of the Web, Bosak, J., Sun Microsystems, Mar. 10, 1997, pp. 1-9.

Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115, 1995.

International Search Report mailed on Jul. 19, 2006, for PCT/IL2005/000784 (6 pages).

Hamming Distance, HTML. Wikipedia.org, Available: http://en.wikipedia.org/wiki/Hamming_distance (as of May 8, 2008).

Office Action Issued in U.S. Appl. No. 11/521,946 mailed May 14, 2008, 10 pgs.

Office Action issued in U.S. Appl. No. 11/521,946 mailed Dec. 9, 2008, 10 pgs.

Office Action issued in U.S. Appl. No. 11/521,946 mailed May 13, 2009, 12 pgs.

Freund et al., Statistical Methods, 1993, Academic Press Inc., United Kingdom Edition, pp. 112-117.

Merriam-Webster dictionary defines "member" as "individuals", 2008.

Waddington, D., "Does it signal convergence of operational and analytic MDM?" retrieved from the internet:<URL: http://www.intelligententerprise.com>, 2 pages, Aug. 2006.

International Search Report mailed on Oct. 10, 2008, for PCT Application No. PCT/US07/20311 (10 pp).

International Search Report and Written Opinion issued in PCT/US07/89211, mailing date of Jun. 20, 2008.

International Search Report and Written Opinion for PCT/US08/58404, dated Aug. 15, 2008.

International Preliminary Report on Patentability Under Chapter 1 for PCT Application No. PCT/US2008/058665, issued Sep. 29, 2009, mailed Oct. 8, 2009, 6 pgs.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
Martha E. Fair, et al., "Tutorial on Record Linkage Slides Presentation", Chapter 12, pp. 457-479, Apr. 1997.
International Search Report and Written Opinion mailed on Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Ohgaya, Ryosuke et al., "Conceptual Fuzzy Sets-, NAFIPS 2002, Jun. 27-29, 2002, pp. 274-279.Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rate (Auto-Link Threshold)", Publicly available on Apr. 2, 2009; memorandum.
Jason Woods, "Workbench 8.0 Bucket Analysis Tools", Publicly available on Apr. 2, 2009.
"Parsing" Publicly available on Oct. 2, 2008.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support via Memtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO As a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1—Draft; Publicly available on Oct. 2, 2008.
Initiate, "Arriba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #NNNN Conditional Governance", Version 1.0—Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005.
End User Training CMT; CIO Maintenance Tool (CMT) Training Doc; Publicly available on Sep. 29, 2006.
"Hierarchy Viewer—OGT 3.0t", Publicly available on Sep. 25, 2008.
"Building and Searching the OGT", Publicly available on Sep. 29, 2006.
Sean Stephens, "Requirement Specification B2B Web Client Architecture", Version 0.1—Draft; Publicly available on Sep. 25, 2008.
"As of: OGT 2.0", Publicly available on Sep. 29, 2006.
Initiate, "Java SDK Self-Training Guide", Release 7.0; Publicly available on Mar. 24, 2006.
Initiate, "Memtype Expansion Detailed Design", Publicly available on Apr. 2, 2009.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008.
Initiate, "Implementation Defined Segments—Gap Analysis", Publicly available on Mar. 20, 2008.
"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.

* cited by examiner

700

| | | BOBS | FLOWER | SHOP |
|---|---|---|---|---|
| | (0,0) 0 __702a1__ | (0,0) 0 __702a3__ | (0,0) 0 __702a4__ | (0,0) 0 __702a__ |
| BOBS | (0,0) 0 __702a2__ | (1,1) 200 __702b__ | (1,1) 200 __702c__ | (1,1) 200 __702d__ |
| VERY | (0,0) 0 __702a__ | (1,1) 200 __702e__ | (1,1) 200 __702f__ | (1,1) 200 __702g__ |
| PRETTY | (0,0) 0 __702a__ | (1,1) 200 __702h__ | (1,1) 200 __702i__ | (1,1) 200 __702j__ |
| FLOWER | (0,0) 0 __702a__ | (1,1) 200 __702k__ | (4,2) 500 __702l__ | (4,2) 500 __702m__ |
| SHOPPE | (0,0) 0 __702a__ | (1,1) 0 __702n__ | (4,2) 500 __702o__ | (5,3) 550 __702p__ |

| | | BOBS | VP | FLOWER | SHOP |
|---|---|---|---|---|---|
| | (0,0) 0 802a1 | (0,0) 0 802a3 | (0,0) 0 802a4 | (0,0) 0 802a | (0,0) 0 802a |
| BOBS | (0,0) 0 802a2 | (1,1) 200 802b | (1,1) 200 802c | (1,1) 200 802d | (1,1) 200 802e |
| VERY | (0,0) 0 802a | 802f | (2,2) 250 802g | 802h | 802i |
| PRETTY | (0,0) 0 802a | 802j | (3,2) 300 802k | | |
| FLOWER | (0,0) 0 802a | | | | |
| SHOP | (0,0) 0 802a | | | | |

| | | BOBS | VP | FLOWER | SHOP |
|---|---|---|---|---|---|
| | (0,0) 0 802a1 | (0,0) 0 802a3 | (0,0) 0 802a4 | (0,0) 0 802a | (0,0) 0 802a |
| BOBS | (0,0) 0 802a2 | (1,1) 200 802b | (1,1) 200 802c | (1,1) 200 802d | (1,1) 200 802e |
| VERY | (0,0) 0 802a | (1,1) 200 802f | (2,2) 250 802g | (2,2) 250 802h | (2,2) 250 802i |
| PRETTY | (0,0) 0 802a | (1,1) 200 802j | (3,2) 300 802k | (3,2) 300 802l | (3,2) 300 802m |
| FLOWER | (0,0) 0 802a | (1,1) 200 802n | (3,2) 300 802o | (4,3) 700 802p | (4,3) 700 802q |
| SHOP | (0,0) 0 802a | (1,1) 200 802r | (3,2) 300 802s | (4,3) 700 802t | (4,5) 850 802u |

*FIG. 8B*

METHOD AND SYSTEM FOR COMPARING ATTRIBUTES SUCH AS BUSINESS NAMES

CROSS-REFERENCE TO RELATED APPLICATIONS

This is a continuation of and claims a benefit of priority under 35 U.S.C. §120 of the filing date of U.S. patent application Ser. No. 11/521,928, now allowed, entitled "METHOD AND SYSTEM FOR COMPARING ATTRIBUTES SUCH AS BUSINESS NAMES" by Norm Adams, Scott Ellard and Scott Schumacher, filed Sep. 15, 2006 now U.S. Pat. No. 7,685,093, and is fully incorporated herein by reference.

TECHNICAL FIELD OF THE INVENTION

This invention relates generally to associating data records, and in particular to identifying data records that may contain information about the same entity such that these data records may be associated. Even more particularly, this invention relates to the standardization and comparison of attributes within data records.

BACKGROUND OF THE INVENTION

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to other relevant pieces of data about the same entity. The databases also permit a person to query the database to find data records pertaining to a particular entity, such that data records from various data stores pertaining to the same entity may be associated with one another.

A data store, however, has several limitations which may limit the ability to find the correct data about an entity within the data store. The actual data within the data store is only as accurate as the person who entered the data, or an original data source. Thus, a mistake in the entry of the data into the data store may cause a search for data about an entity in the database to miss relevant data about the entity because, for example, a last name of a person was misspelled or a social security number was entered incorrectly, one or more attributes are missing, etc. A whole host of these types of problems may be imagined: two separate records for an entity that already has a record within the database may be created such that several data records may contain information about the same entity, but, for example, the names or identification numbers contained in the two data records may be different so that it may be difficult to associate the data records referring to the same entity with one another.

For a business that operates one or more data stores containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and prevent the user from picking the wrong data record, it is also desirable to identify and associate data records from the various information sources that may contain information about the same entity. There are conventional systems that locate duplicate data records within a database and delete those duplicate data records, but these systems only locate data records which are identical to each other or use a fixed set of rules to determine if two records are identical. Thus, these conventional systems cannot determine if two data records, with, for example, slightly different last names, nevertheless contain information about the same entity. In addition, these conventional systems do not attempt to index data records from a plurality of different information sources, locate data records within the one or more information sources containing information about the same entity, and link those data records together. Consequently, it would be desirable to be able to associate data records from a plurality of information sources which pertain to the same entity, despite discrepancies between attributes of these data records.

Thus, there is a need for system and methods for comparing attributes of data records which takes into account discrepancies between these attributes which may arise, and it is to this end that embodiments of the present invention are directed.

SUMMARY OF THE INVENTION

Embodiments of systems and methods for comparing attributes of a data record are presented herein. Broadly speaking, embodiments of the present invention generate a weight based on a comparison of the name (or other attributes of data records. More particularly, embodiments of the present invention provide a set of code (e.g., a computer program product comprising a set of computer instructions stored on a computer readable medium and executable or translatable by a computer processor) translatable to generate a weight based on a comparison of the name attributes of data records. More specifically, embodiments of the present invention may calculate an information score for each of two name attributes to be compared to get an average information score for the two name attributes. The two name attributes may then be compared against one another to generate a weight between the two attributes. This weight can then be normalized to generate a final weight between the two business name attributes.

In one embodiment, each of the tokens of one attribute may be compared to the tokens of the other attribute to generate a weight for the two attributes. The comparison of each of the pairs of tokens may be accomplished by determining a current match weight for the pair of tokens, determining a first and second previous match weight for the pair of tokens and setting the weight to the current match weight if the current match weight is greater than both the first and second previous match weight or setting the weight to the greater of the first previous match weight or the second previous match weight otherwise.

In another embodiment, tokens of either attribute which are acronyms for tokens in the other attribute may be taken into account when comparing the two attributes.

Embodiments of the present invention may provide the technical advantage that attributes of the data records (and attributes in general) may be more effectively compared by allowing a weight to be generated by performing a whole host of comparisons on the tokens of the attributes. By more effectively comparing attributes of data records, the comparison and linking of various data records may be more effective in taking into account a variety of real world conditions which may occur during the entering or processing of data records such as mistakes that may be made or differences which may occur when entering data, variations in capabilities or formats of different systems, changes in personal conditions such as name changes due to marriage, etc.

Other technical advantages of embodiments of the present invention include the lesser weighting of frequently utilized tokens (e.g. Inc., Store, Co.), improving the accuracy of the generated weight. Additionally, when the two attributes are compared each is analyzed to determine if either attribute comprises one or more acronyms which also improve the accuracy of the comparison. Furthermore a variety of types of comparisons may take place between the different tokens, including an exact match where tokens match exactly or a phonetic match where the tokens match phonetically. The tokens may also be compared to determine if the edit distance between the two tokens is less than a certain distance (e.g. 20% of the longer of the two tokens) or if an initial token of one attribute matches a token of the other attribute. The weight generated for the two attributes may reflect the different types of matches which occur between the tokens of the two attributes.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 depicts an example of a table for use in describing an example of the application of one embodiment of the present invention.

FIGS. 8A and 8B depict examples of tables for use in describing an example of the application of one embodiment of the present invention.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
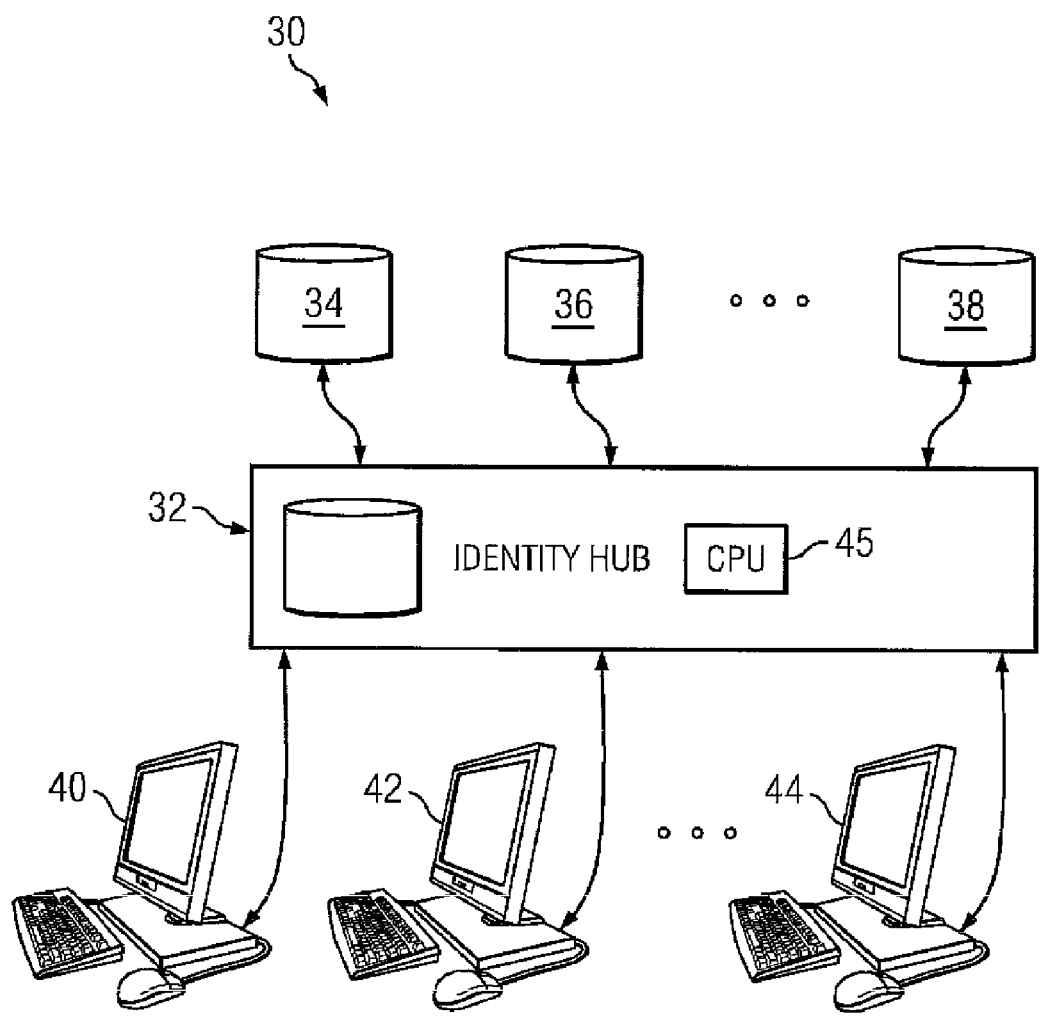
FIG. 1 depicts one embodiment of an example infrastructure.

Before turning to embodiments of the present invention, a general description of an example infrastructure or context which may be helpful in explaining these various embodiments will be described. A block diagram of one embodiment of just such an example infrastructure is described in FIG. 1. FIG. 1 is a block diagram illustrating one embodiment of an entity processing system 30 in accordance with embodiments of the invention. The entity processing system 30 may include an identity hub 32 that processes, updates or stores data pertaining to data records about one or more entities from one or more data sources 34, 36, 38 and responds to commands or queries from a plurality of operators 40, 42, 44, where the operators may be either users or information systems. The identity hub 32 may operate with data records from a single information source or, as shown, data records from multiple information sources. The entities tracked using the identity hub 32 may include for example, patients in a hospital, participants in a health care system, parts in a warehouse or any other entity that may have data records and information contained in data records associated with it. The identity hub 32 may be one or more computer systems with a central processing unit 45 executing computer readable instructions (e.g. a software application) that performs the function of the identity hub 32. The identity hub 32 may also be implemented using hardware circuitry.

As shown, the identity hub 32 may receive data records from the data sources 34, 36, 38 as well as write corrected data back into the data sources 34, 36, 38. The corrected data communicated to the data sources 34, 36, 38 may include information that was correct, but has changed, information about fixing information in a data record or information about links between data records.

In addition, one of the operators 40, 42, 44 may transmit a query to the identity hub 32 and receive a response to the query back from the identity hub 32. The one or more data sources 34, 36, 38 may be, for example, different databases that possibly have data records about the same entities. For example, in the health care field, each data source 34, 36, 38 may be associated with a particular hospital in a health care organization and the health care organization may use the identity hub 32 to relate the data records associated with the plurality of hospitals so that a data record for a patient in Los Angeles may be located when that same patient is on vacation and enters a hospital in New York. The identity hub 32 may be located at a central location and the data sources 34, 36, 38 and users 40, 42, 44 may be located remotely from the identity hub 32 and may be connected to the identity hub 32 by, for example, a communications link, such as the Internet or any other type communications network, such as a wide area network, intranet, wireless network, leased network, etc.

The identity hub 32 may have its own database that stores complete data records in the identity hub, or alternatively, the identity hub may also only contain sufficient data to identify a data record (e.g., an address in a particular data source 34, 36, 38) or any portion of the data fields that comprise a complete data record so that the identity hub 32 can retrieve the entire data record from the data source 34, 36, 38 when needed. The identity hub 32 may link data records together containing information about the same entity utilizing an entity identifier or an associative database separate from actual data records. Thus, the identity hub 32 may maintain links between data records in one or more data sources 34, 36, 38, but does not necessarily maintain a single uniform data record for an entity.

More specifically, the identity hub may link data records in data sources 34, 36, 38 by comparing a data record (received from an operator, or from a data source 34, 36, 38) with other data records in data sources 34, 36, 38 to identify data records which should be linked together. This identification process may entail a comparison of one or more of the attributes of the data records with like attributes of the other data records. For example, a name attribute associated with one record may be compared with the name of other data records, social security number may be compared with the social security number of another record, etc. In this manner, data records which should be linked may be identified.

It will be apparent to those of ordinary skill in the art, that both the data sources 34, 36, 38 and the operators 40, 42, 44 may be affiliated with similar or different organizations or owners. For example, data source 34 may be affiliated with a hospital in Los Angeles run by one health care network, while data source 36 may be affiliated with a hospital in New York run by another health care network. Thus, the data records of each of data sources may be of a different format.

Figure 2A:
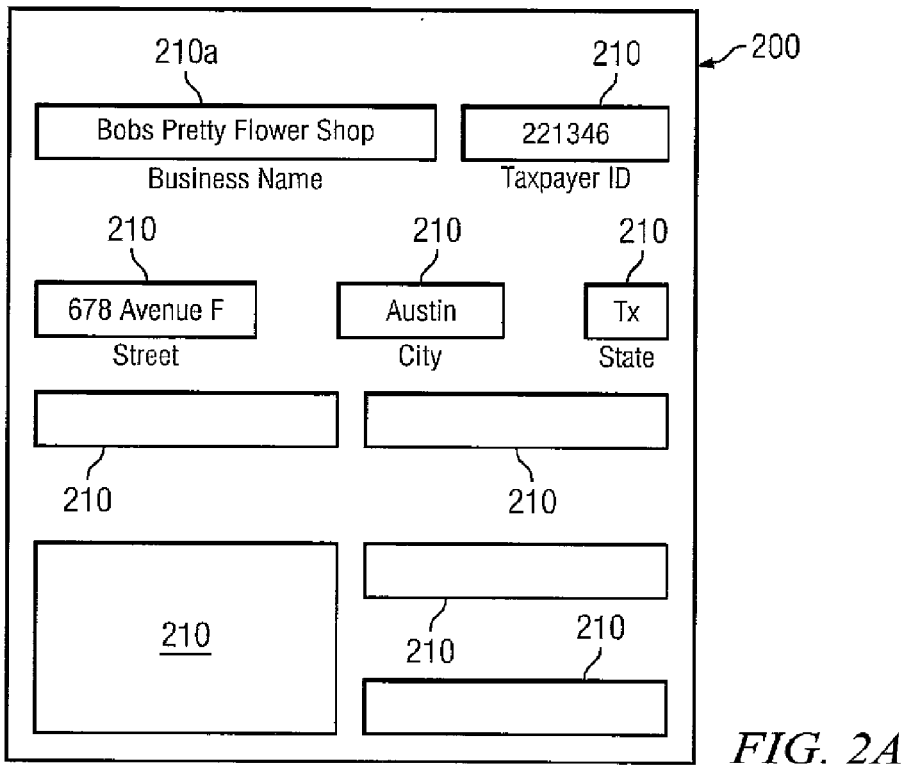
FIGS. 2A and 2B depict a representation of two embodiments of data records.
Figure 2B:
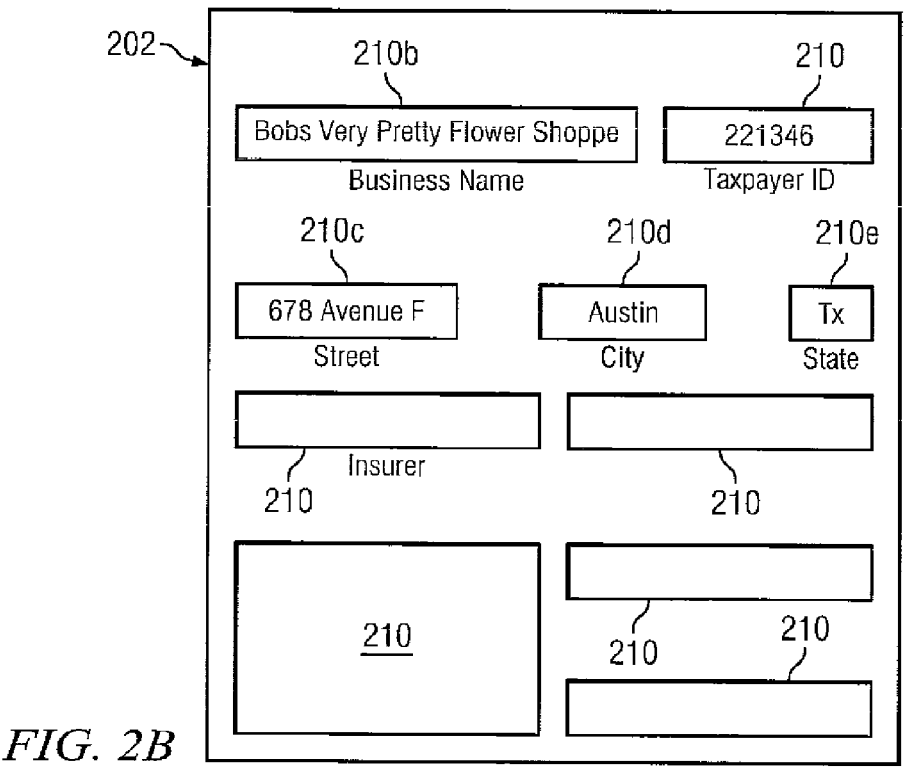

This may be illustrated more clearly with reference to FIGS. 2A and 2B, depicting two embodiments of example data records. Each of these data records 200, 202 has a set of fields 210 corresponding to a set of attributes of each of the data records. For example, one of the attributes of each of the records 200 may be a name, another attribute may be a taxpayer number, etc. It will be apparent that an attribute may comprise multiple fields 210 of a data record 200, 202, for example, an address attribute of data record 202 may comprise fields 210c, 210d and 210e, the street, city and state fields, respectively.

Notice, however, that each of the records may have a different format, for example data record 202 may have a field 210 for the attribute of insurer, while data record 200 may have no such field. Similarly, like attributes may have different formats as well. For example, name field 210b in record 202 may accept the entry of a full name, while name field 210a, in record 200 may be designed to allow entry of a name of a limited length.

As may be imagined, discrepancies such as this may be problematic when comparing two or more data records (e.g. attributes of data records) to identify data records which should be linked. The name "Bobs Flower Shop" is not the same as "Bobs Very Pretty Flower Shoppe". Similarly, a typo or mistake in entering data for a data record may also affect the comparison of data records (e.g. comparing the name "Bobs Pretty Flower Shop" with "Bobs Pretty Glower Shop" where "Glower" resulted from a typo in entering the word "Flower").

To deal with these possibilities, a variety of name comparison techniques are utilized to generate a weight based on the comparison (e.g. similarity) of names in different records where this weight could then be utilized in determining whether two records should be linked, including various phonetic comparison methods, weighting based on frequency of name tokens, initial matches, nickname matches, etc. More specifically, the tokens of the name attribute of each record would be compared against one another, using methodologies to match the tokens including if the tokens matched exactly, phonetically, etc. These matches could then be given a weight, based upon the determined match (e.g. an exact match was given one weight, a certain type of initial match was given a certain weight, etc.) These weights could then be aggregated to determine an overall weight for the degree of match between the name attribute of two data records.

These techniques were not without their various problems, however, especially when applied to business names. This is because business names may present a number of fairly specific problems as a result of their nature. Some business names are very short (e.g. "Quick-E-Mart") while others are very long (e.g. "San Francisco's Best Coffee Shop"). Additionally, business names may frequently use similar words (e.g. "Shop", "Inc.", "Co.") which, though identical, should not weigh heavily in any heuristic for comparing these names. Furthermore, acronyms are frequently used in business names, for example a business named "New York City Bagel" may frequently be entered into a data record as "NYC Bagel".

In many cases the algorithms employed to compare business names would not take account of these specific peculiarities when comparing business names. There was no support for acronyms, the frequency of certain words in business names was not accounted for and the ordering of tokens within a business name was not accounted for (e.g. the name "Clinic of Austin" may have been deemed virtually identical to "Austin Clinic"). In fact, in some cases two name attributes which only partially matched may have received a higher weight than two names attributes which match exactly. Consequently, match weights between business names were skewed, and therefore skewed the comparisons between data records themselves. Thus, it would be desirable to utilize comparison algorithms which generate weights which better reflect the similarity between name attributes of different records.

To that end, attention is now directed to systems and methods for comparing attributes. Broadly speaking, embodiments of the present invention generate a weight based on a comparison of the name attributes of data records. More specifically, embodiments of the present invention may calculate an information score for each of two name attributes to be compared to get an average information score for the two name attributes. The two name attributes may then be compared against one another to generate a weight between the two attributes. This weight can then be normalized to generate a final weight between the two business name attributes.

Figure 3:
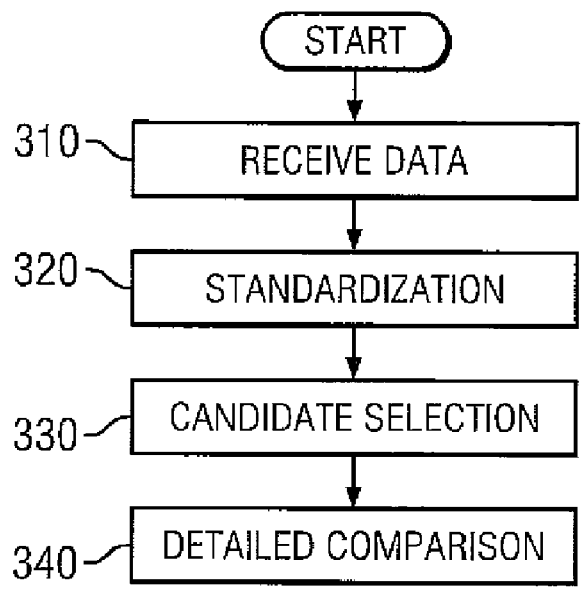
FIG. 3 depicts a flow diagram for one embodiment of comparing data records.

To aid in an understanding of the systems and methods of the present invention it will be helpful to present an example embodiment of a methodology for identifying records pertaining to the same entity which may utilize these systems and methods. FIG. 3 depicts one such embodiment. A set of data records for comparison may be given for evaluation at step 310. These data records may include, for example, one or more new data records to compare to a set of existing data records (which may already exist in, for example, data sources 34, 36, 38 or which may be provided as well). At step 320 the data records for comparison may be standardized. This standardization may comprise the standardization of attributes of a data record into a standard format, such that subsequent comparisons between like attributes of different data records may be performed according to this standard format. For example, the field 210a of the name attribute of data record 200 may be evaluated to produce a set of tokens for the name attribute (e.g. "Bobs", "Pretty", "Flower" and "Shop") and these tokens concatenated in accordance with a certain form to produce a standardized attribute (e.g. "Bobs:Pretty:Flower:Shop") such that the standardized attribute may subsequently be parsed to generate the tokens which comprise the name attribute. It will be apparent that each of the attributes of the data records to be compared may be tokenized according to a different format, a different set of semantics or lexicon, etc.

In one embodiment, when names are standardized consecutive single tokens are combined into tokens (e.g. I.B.M. becomes IBM) and substitutions are performed. For example (Co. is replaced by "Company", Inc. is replaced by "Incorporated"). An equivalence table comprising abbreviations and their equivalent substitutions may be stored in a database associated with identity hub 32. Pseudocode for one embodiment of standardizing business names in accordance with embodiments of the present invention is as follows:

```
BusinessNameParse(inputString, equivalenceTable):
   STRING outputString
   for c in inputString:
      if c is a LETTER or a DIGIT:
         copy c to outputString
      else if c is one of the following characters [&,',`] (ampersand,
single quote, back quote)
         skip c (do not replace with a space)
      else //non-ALPHA-DIGIT [&,',`] character
         if the last character in output string is not a space, copy a space to
output string.
   //Now extract the tokens.
   tokenList = [ ]
   For token in outputString //outputString is a list of tokens separated
by spaces
      If (token is a single character and it is followed by one or more single
characters)
         Combine the singletokens into a single token
      If (equivalenceTable maps token)
         Replace token with its equivalence.
      Append token to tokenList.
   Return tokenList
```

Once the attributes of the data records to be compared have been standardized at step 320, a set of candidates may be selected to compare to the new data record at step 330. This candidate selection process may comprise a comparison of one or more attributes of the new data records to the existing data records to determine which of the existing new data records are similar enough to the new data records to entail further comparison. These candidates may then undergo a more detailed comparison to the new records at step 340 where a set of attributes are compared between the records to determine if an existing data record should be linked or associated with the new data record. This more detailed comparison may entail comparing each of the set of attributes of one record (e.g. an existing record) to the corresponding attribute in the other record (e.g. the new record) to generate a weight for that attribute. The weights for each of the set of attributes may then be summed to generate an overall weight which can then be compared to a threshold to determine if the two records should be linked.

Figure 4:
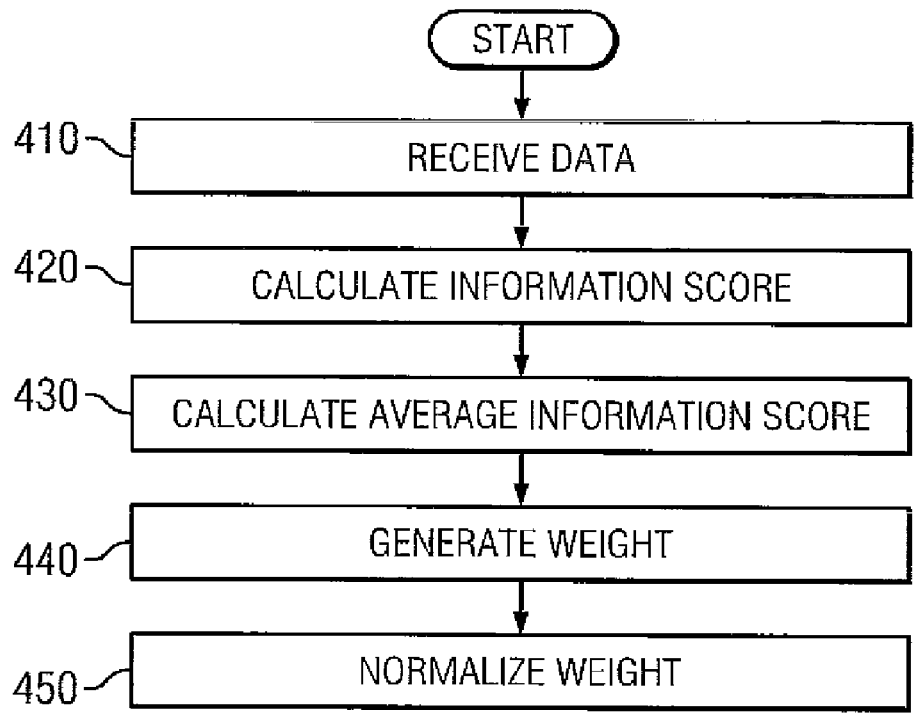
FIG. 4 depicts a flow diagram for one embodiment of a method for comparing attributes of a data record.

Turning now to FIG. 4, a flow diagram for one such embodiment of a method for generating a weight from the comparison of attributes is depicted. Though the embodiment of the methodology depicted may be used to compare any two attributes (e.g. personal names, addresses, company names, etc.) it may especially useful in comparing business names, and will be described as such.

At step 410 two names are given or provided (e.g. input to a software application) such that these names may be compared. The names may each be in a standardized form comprising a set of tokens, as discussed above with respect to FIG. 3. An information score may be calculated for each of the names at step 420. This information score for the attribute may be the sum of the exact match values (also referred to as the information score for the token) of each of the tokens of the name. The information score of the two attributes may then be averaged at step 430.

Using an average value for the information score of the two attributes (instead of, for example, a minimum or maximum information score between the two attributes) may allow embodiments of the name comparison algorithm to allow the generated weight between two attributes to take into account missing tokens between the two attributes, and, in some embodiments, may allow the penalty imposed for missing tokens to be half the penalty imposed for that of a mismatch between two tokens. The information score of each of the tokens may, in turn, be based on the frequency of the occurrence of a token in a data sample. By utilizing relative frequency of tokens to determine an information score for the token, the commonality of certain tokens (e.g. "Inc.") may be taken into account by scoring these tokens lower.

A weight between the two names can then be generated at step 440 by comparing the two names. This weight may then be normalized at step 450 to generate a final weight for the two names. In one embodiment, this normalization process may apply a scaling factor to the ratio of the generated weight to the average information score to generate a normalized index value. This normalized index value may then be used to index a table of values to generate a final weight.

It may be useful here to delve with more detail into the various steps of the embodiment of an algorithm for comparing names depicted in FIG. 4. As such, the first to be addressed will be the calculation of an average information score, as depicted in step 430. As discussed above, the information score for an attribute may be the sum of the exact match weights for each of the tokens of the attribute. It may be useful to describe embodiments of how these exact match weights are calculated. In one embodiment, an exact match weight table may have weight values for an exact match for a token or a default value to use for an exact match for a token. In other words, the exact match weight table may comprise a list of tokens with a corresponding weight value. This weight value may correspond to an exact match weight. Put a different way, if both tokens being compared are the same, the token may be located in the exact match weight table and the corresponding weight is used as the match weight for those two tokens. If two tokens are determined to be an exact match and the token is not in the exact match weight table, a default weight value may be utilized for the match weight.

In one embodiment, the weights associated with the tokens in the exact match weight table may be calculated from a sample set of data record, such as a set of data records associated with one or more of data sources 34, 36, 38 or a set of provided data records. Using the sample set of data records exact match weights may be computed using frequency data and match set data. The number of name strings (e.g. name attributes) $Name_{Tot}$ in the sample set of data records may be computed, and for each name token T corresponding to these name strings a count: $T_{count}$ and a frequency $T_{freq}=T_{count}/Name_{Tot}$.

The tokens are then ordered by frequency with the highest frequency tokens first and a cumulative frequency for each token which is the sum of the frequencies for the token and all those that came before it is computed as depicted in Table 1:

TABLE 1

| Token | Freq | Cumulative Freq |
|---|---|---|
| $T_0$ | $T_{freq\text{-}0}$ | $T_{freq\text{-}0}$ |
| $T_1$ | $T_{freq\text{-}1}$ | $T_{freq\text{-}0} + T_{freq\text{-}1}$ |
| $T_2$ | $T_{freq\text{-}2}$ | $T_{freq\text{-}0} + T_{freq\text{-}1} + T_{freq\text{-}2}$ |
| ... | ... | ... |
| $T_N$ | $T_{freq\text{-}N}$ | $T_{freq\text{-}0} + ... + T_{freq\text{-}N}$ |

All tokens up to and including the first token whose cumulative frequency exceeds 0.80 are then determined and for each of these tokens the exact match weight may be computed using the formula: $Exact_{Ti}=-\ln(T_{freq-i})$. If $T_M$ is the first token whose cumulative frequency exceeds 0.80 and $T_N$ is the last token or the lowest frequency token the default exact match weight can be computed by taking the average of $-\ln(T_{freq-M+1}), \ldots -\ln(T_{freq-N})$. An embodiment of the compare algorithm described herein for comparing names may then be applied to a set of random pairs of names in the data set to generate: $Ran_{NameComp}$=The total number of name string pairs compared and For I=0 to MAX_SIM, $Rans_{Sim-I}$=the total number of name string pairs whose normalized similarity is I. For each I, $RanFreq_{Sim-I}=Ran_{Sim-I}/Ran_{NameComp}$ can then be computed. Using the weight generation process as described in U.S. patent application Ser. No. 11/522,223 titled "Method and System For Comparing Attributes Such as Personal Names" by Norm Adams et al filed on Sep. 15, 2006, which is fully incorporated herein by reference and as described below, $MatchFreq_{Sim-I}=Match_{Sim-I}/Match_{NameComp}$ can also be computed for a token. Final weights for a token may then be computed as: Weight-Norm-$Sim_I$=log 10($MatchFreq_{Sim-I}/RanFreq_{Sim-I}$).

Once the exact match weights for a set of tokens are calculated they may be stored in a table in a database associated with identity hub 32. For example, the following pseudocode depicts one embodiment for calculating an information score for an attribute utilizing two tables an "initialContent" table comprising exact match weights for initials, and "exactContent" comprising exact match weights for other tokens:

```
tokenListInfo(tList)
totalInfo = 0.0
for token in tList:
    if token is an initial:
        totalInfo += initialContent(token)
    else
        totalInfo += exactContent(token)
return totalInfo
```

Figure 5A:
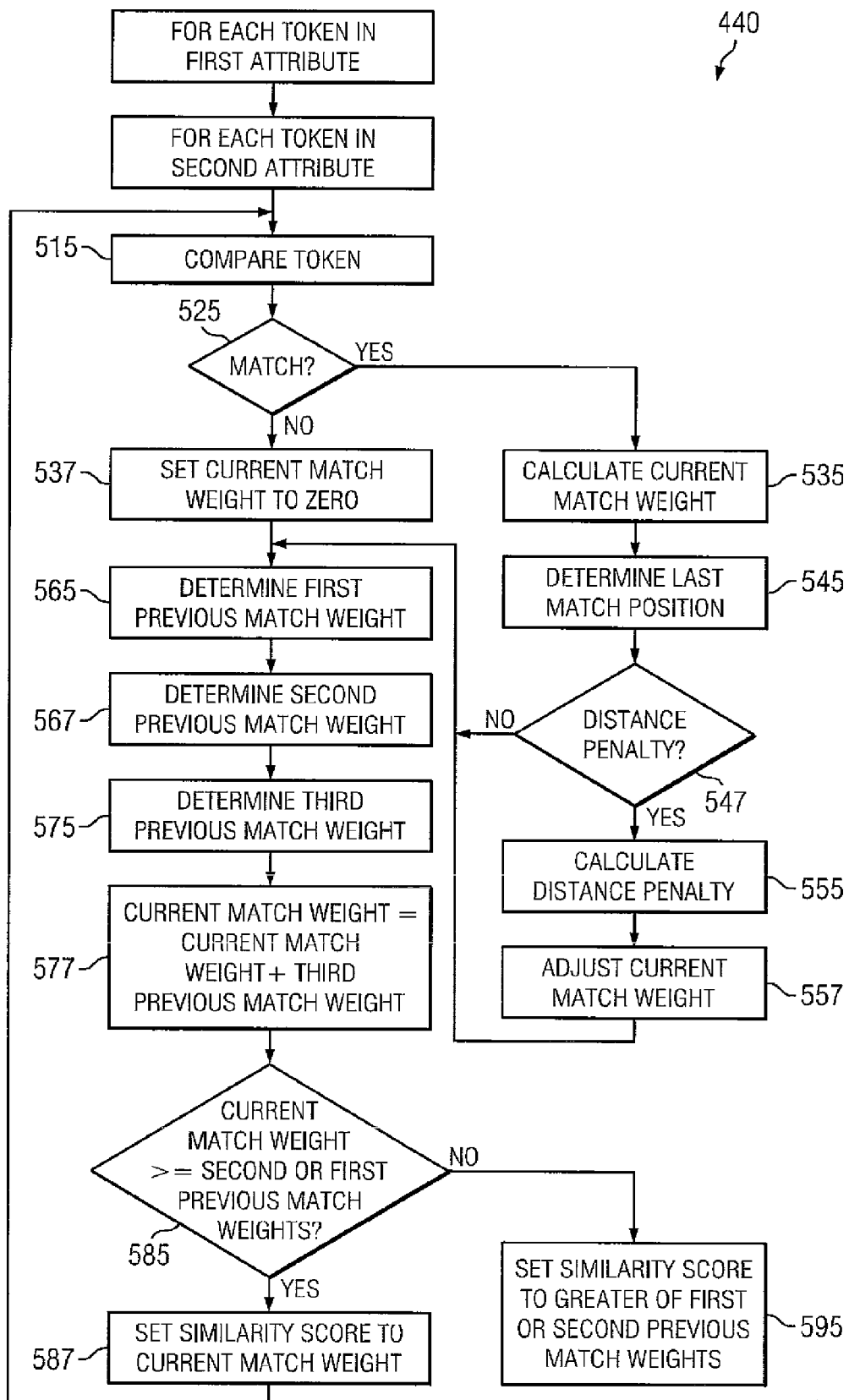
FIGS. 5A and 5B depicts a flow diagram for one embodiment of a method for determining a weight for two attributes.

Referring still to FIG. 4, once information scores are calculated and these weights averaged at step 430, a weight may be generated for the two names at step 440. Turning now to FIG. 5A, a flow diagram for one embodiment of a method for generating a weight between two attributes is depicted. More particularly, each token of one attribute may be compared at step 515 to each token of the other attribute. This comparison may take place according to the order of the set of tokens comprising each attributes. In other words, the first token of one attribute may be compared to each of the tokens of the other attribute, after which the second token of the attribute may be compared to each of the tokens of the other attribute, etc.

For each of these pairs of tokens it may be determined if a match exists between the two tokens at step 525. If no match exists between the two tokens at step 525 the current match weight may be set to zero at step 537. If a match exists between the two tokens, however, the current match weight for the two tokens may be calculated at step 535.

Once it has been determined if a match exists between the two tokens at step 525 and the match weight calculated at step 535 for the current match weight if such a match exists, it may be determined if a distance penalty should be imposed at step 547. In one embodiment, it may be determined if a distance penalty should be imposed, and the distance penalty computed, based on where the last match between a pair of tokens of the attributes occurred. To this end, a last match position may be determined at step 545 indicating where the last match between two tokens of the attributes occurred. If the difference in position (e.g. relative to the attributes) between the current two tokens being compared and the last match position is greater than a certain threshold a distance penalty may be calculated at step 555 and the current match weight adjusted at step 557 by subtracting the distance penalty from the current match weight. It will be apparent that these difference penalties may differ based upon the difference between the last match position and the position of the current tokens.

Match weights for previous tokens of the attributes may also be determined at steps 565, 567 and 575. More particularly, at step 565 a first previous match weight is determined for the token of one attribute currently being compared and the previous (e.g. preceding the current token being compared in order) token of the second attribute currently being compared, if it exists. Similarly, at step 567 a second previous match weight is determined for the token of second attribute currently being compared and the previous token of the first attribute currently being compared, if it exists. At step 575 a third previous match weight is determined using the previous tokens of each of the current attributes, if either token exist. The current match weight for the pair of tokens currently being compared may then be adjusted at step 577 by adding the third previous match weight to the current match weight.

The current match weight may then be compared to the first and second previous match weight at step 585, and if the current match weight is greater or equal to either of the previous match weights the weight may be set to the current match weight at step 587. If, however, the first or second previous match weight is greater than the current match weight the weight will be set to the greater of the first or second previous match weights at step 595. In this manner, after each of the tokens of the two attributes has been compared a weight will be produced.

Figure 5B:
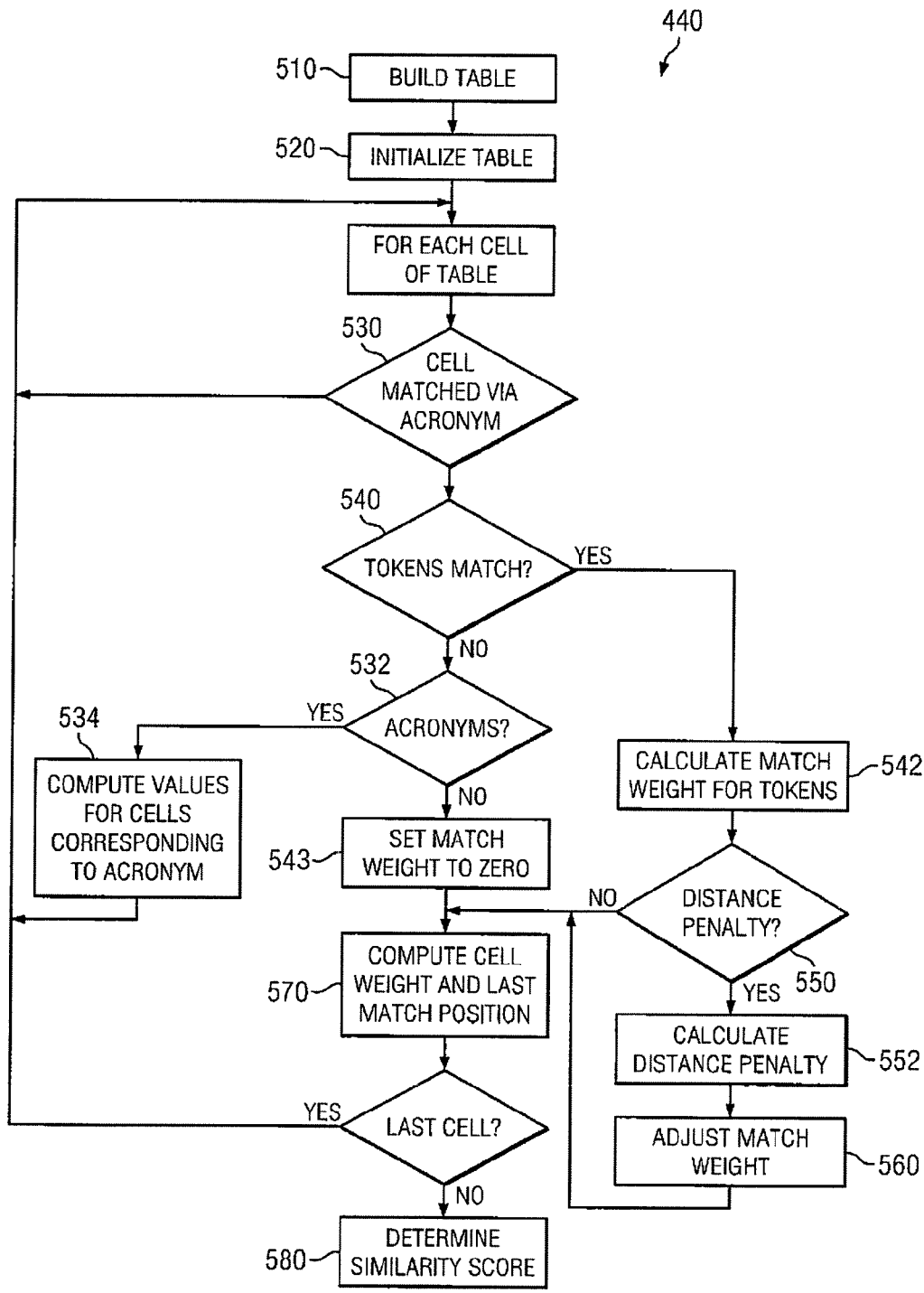

It will be apparent that many types of data elements or data structures may be useful in implementing certain embodiments of the present invention. For example, FIG. 5B depicts a flow diagram for one embodiment of a method for generating a weight between two attributes utilizing a table. At step 510 a table may be built to aid in the comparison of the two names. This table may comprise a row for each of the tokens in one of the names plus an additional row, and a column for each of the tokens in the other name plus an additional column. Thus, the first row and the first column of the table may correspond to initial conditions, while each of the other cells of the table may correspond to a unique pair of tokens, one token from each of the names being compared. Each cell of the table may have the ability to store a position (e.g. cell) indicator and a weight. While a table is utilized in the embodiment illustrated it will be apparent that a table is an example structure only, and any data structure, structure storage may be utilized (e.g. an array of any dimension, a linked list, a tree, etc.).

After the table is built at step 510, it may be initialized at step 520 such that certain initial cells within the table have initial values. More particularly, in one embodiment each of the first row and first column may be initialized such that the position indicator may receive a null or zero value and the weight associated with each of these cells may be initialized to a zero value.

Each of the other cells (e.g. besides the initial cells) of the table may then be iterated through to determine a position and a value to be associated with the cell. For each cell it is determined if the cell has already been matched through an acronym match at step 530, and if so the cell may be skipped. If the cell has not been previously matched, however, at step 540 it may be determined if a match exists between the two tokens corresponding cell, if no match exists it may then be determined if either of the tokens corresponding to the cell is an acronym for a set of the tokens in the other name at step 532, by, in one embodiment, comparing the characters of one token to the first characters of a set of tokens of the other name. If one of the tokens is an acronym for a set of tokens in the other name, a last position indicator and cell weight (as described in more detail below) are calculated at step 534 for the set of cells whose corresponding tokens are the acronym and the set of tokens of the other name which correspond to the acronym. Pseudocode for determining if one token is an acronym for a set of tokens of the other name is as follows:

```
MAX_INIT_MATCH is the maximum acronym length, in this
embodiment 3.
acroynmCheck(acToken, //a token which we will check as a possible
acronym
    tokenList, //the other list of tokens
    currentPosition //start at this position to check for an acronym match
    )
    if (length(acToken) < 2 or >MAX_INIT_MATCH)
        return NO_MATCH
    if (currentPosition + length(acToken) – 1 > length(tokenList))
        return NO_MATCH
    listPosition = currentPosition
    tokenPosition = 0
    totalInfo = 0
    while(tokenPosition != end of word)
        if firstChar of tokenList[listPosition] != acToken[tokenPosition]
            return NO_MATCH
        totalInfo = totalInfo + initialContent(firstChar) –
        INIT_PENALTY
        tokenPosition++
        listPosition++
    return MATCH, totalInfo, listPosition
```

If it is determined that neither of the tokens is an acronym at step 532, the match weight for the current cell may be set to zero at step 543. Returning to step 540, if a match exists between the two tokens corresponding to the current cell, the match weight for the two tokens may be calculated at step 542. Though virtually any type of comparison may be utilized to compare the two corresponding tokens and generate an associated match weight according to steps 540 and 542, in one embodiment it may be determined if an exact match, an initial match, a phonetic match, a nickname match or a nickname-phonetic match occurs and a corresponding match weight calculated as described in U.S. patent application Ser. No. 11/522,223 titled "Method and System For Comparing Attributes Such as Personal Names" by Norm Adams et al filed on Sep. 15, 2006 which is fully incorporated herein by reference. Pseudocode for comparing two tokens and generating an associated match weight is as follows:

```
tokenCompare(t1, t2) //t1 and t2 are tokens.
    If one or both is an intial:
        If first chars agree:
            Return min(exactContent1, exactContent2) – Initial_Penalty
        Else
            Return 0.0, NO_MATCH
    Dist = normalizedEditDistance(t1, t2)
    If Dist == 0
        Return exactContent(t1), EXACT_MATCH
    If tokens match phonetically
        Return min(exactContent1, exactContent2) - phonetic_Penalty,
PARTIAL_MATCH
    If tokens match via a nickname
        Return Return min(exactContent1, exactContent2) -
Nickname_Penalty, PARTIAL_MATCH
    if there is a nickname-phonetic match
        Return Return min(exactContent1, exactContent2) -
Nickphone_Penalty, PARTIAL_MATCH
    If Dist <= 0.2 * maximum token length
        Return min(exactContent1, exactContent2) - Nickname_Penalty,
PARTIAL_MATCH
    Else:
        Return 0.0, NO_MATCH
```

Looking still at FIG. 5B, once it has been determined if a match exists between the two tokens corresponding to the cell at step 540 and the match weight calculated at step 542 if such a match exists, it may be determined if a distance penalty should be imposed at step 550 and the distance penalty calculated at step 552. In one embodiment, it may be determined if a distance penalty should be imposed, and the distance penalty computed, based on a difference between the position of a cell which corresponds to a last position match and the current cell. A difference in row position and column position may be calculated, and if the difference is greater than one (indicating that a distance penalty should be imposed), the largest of these differences may used to determine a distance penalty to impose. For example, if the difference between the current cells row and the row of the cell with the last match is two and the difference between the current cells column and the column of the cell with the last match is three, a distance penalty associated with the distance of three which may be utilized. It will be apparent that larger difference penalties may associated and imposed based upon a greater distance between the last match cell and the current cell being evaluated. If, indeed, it is determined that a distance penalty should be imposed and the distance penalty calculated at step 550, the match weight may then be adjusted at step 560 by subtracting the distance penalty from the match weight.

Figure 6:
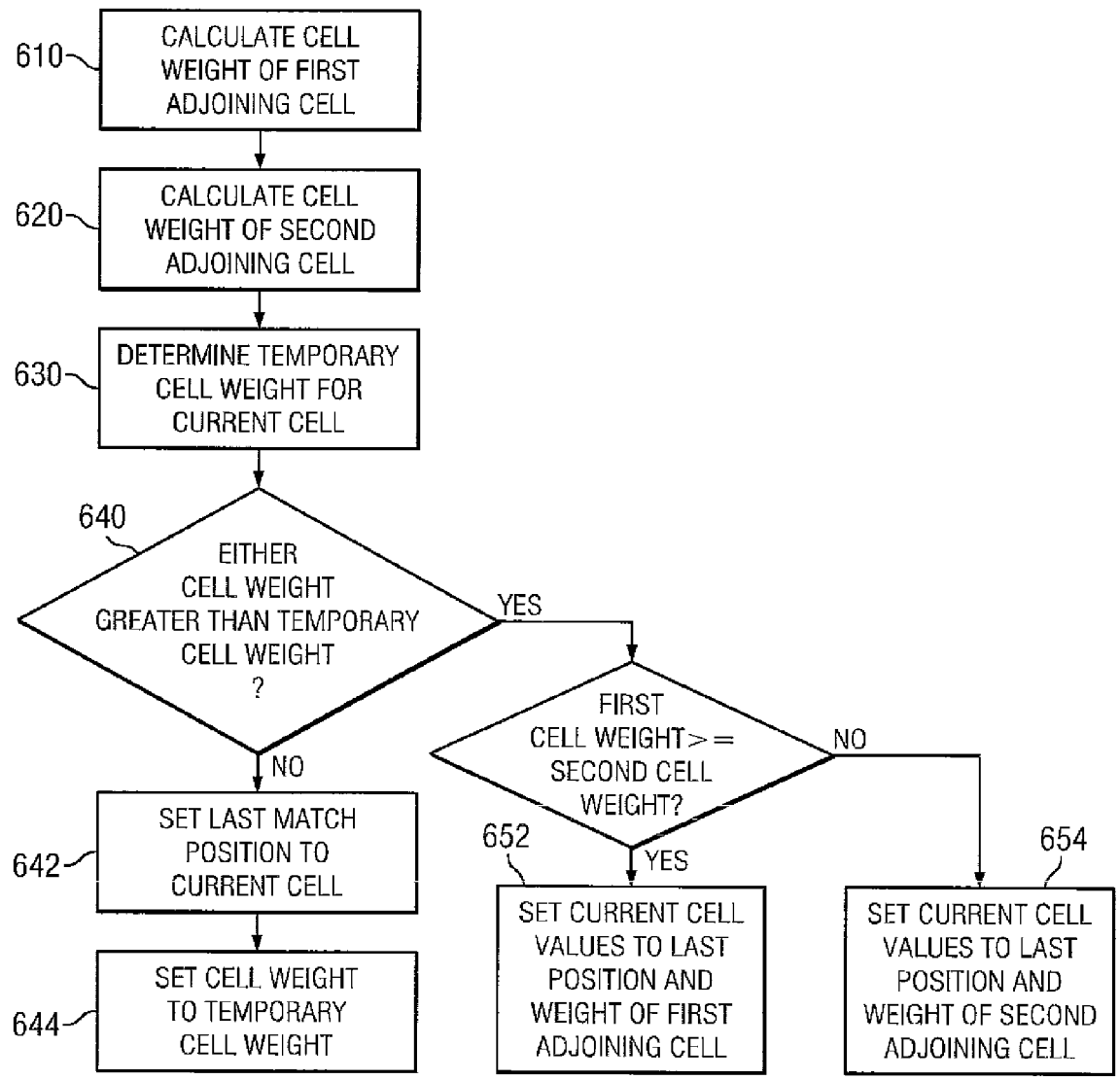
FIG. 6 depicts a flow diagram for one embodiment of a method for determining values used in the computation of a weight.

Using the match weight for the cell then, a cell weight and last match position for the cell may be calculated at step 570. A flow diagram for one embodiment of a method for calculating a last match position and a cell weight for a cell is depicted in FIG. 6. Generally, the cell weight and last match position may be calculated based on the last match position and the cell weight of surrounding cells. In particular, a cell weight from one cell adjoining the current cell (e.g. the row number of the current cell minus one and the same column number) may be determined at step 610 and the cell weight from another cell adjoining the current cell (e.g. the column number of the current cell minus one and the same row number) may be determined at step 620. At step 630 a temporary cell weight may be determined by adding the cell weight of the adjoining cell on a diagonal (e.g. the row number of the current cell minus one and the column number of the current cell minus one) to the match weight calculated for the current cell (step 570).

The cell weights from the two adjoining cells and the temporary cell weight may be compared at step 640. If the temporary cell weight is greater than either of the cell weights of the adjoining cells, the last match position of the current cell is set to the position of the current cell at step 642 and the cell weight of the current cell is set to the temporary cell weight at step 644. If however, either of the cell weights exceeds the temporary cell weight, the greater of the two cell weights will be assigned as the cell weight of the current cell and the value of the last match position indicator of that cell (e.g. adjoining cell with higher cell weight) will be assigned as the last position indicator of the current cell at step 652 or step 654.

Returning now to FIG. 5B, after every cell in the table has been iterated through in the manner described above, at step 580 the weight for the two names being compared may be the cell weight of the last cell of the table (e.g. last row, last column). Once the weight is determined at step 580 then, this weight may, in one embodiment, be normalized as depicted in step 450 of FIG. 4, by computing a ratio of the weight for the two names to the average information value of the two names and multiplying this ratio by a maximum index value to yield a normalized index value. This normalized index value may then be used to determine a final weight by, in one embodiment, indexing a table of weights stored in a database of identity hub 32 using the index value.

Before delving into examples of the application of embodiments of the above described methods, it may be useful to discuss how various match and distribution penalties are determined. In one embodiment, to calculate these penalties an embodiment of a compare algorithm such as that described with respect to FIG. 4 is applied to a set of random pairs of names obtained from a sample set of data records. Typically around 10 million pairs of names may be used. While applying the compare algorithm the following may be tracked:

$Ran_{Comp}$=The total number of name tokens that are compared.

$Ran_{Exact}$=The total number of name tokens that agree exactly.

$Ran_{Initial}$=The total number of name tokens that agree via an initial match. An initial match is one in which the first characters agree, one token has length 1 and the other's length is greater than 1.

$Ran_{Phonetic}$=The total number of name tokens that agree phonetically, not exactly.

$Ran_{Nickname}$=The total number of name tokens that have a common nickname, and don't match Exactly.

$Ran_{NickPhone}$=The total number of name tokens that have nicknames that match phonetically and don't match Exactly or via a Nickname alone $Ran_{Edit}$=The total number of name tokens that match via an edit distance compare and do not match exactly.

$Ran_{Dist-0}$=(CXNM only) The total number of name tokens that match exactly and where the previous tokens in each name string also matched.

EXAMPLE 1 in BOBS FLOWER SHOP compared to BOBS FLOWER SHOP, the exact matches for FLOWER would be counted, since the there was an exact match BOBS in the previous tokens. Similarly SHOP would also get counted.

EXAMPLE 2

In BOBS FLOWER SHOP compared to BOBS PRETTY FLOWER SHOP. FLOWER would not get counted, since the previous tokens are BOBS and PRETTY and that is a match. SHOP would get counted.

$Ran_{Dist-1}$, $Ran_{Dist-2}$, $Ran_{Dist-3}$=(CXNM only) The total number of name tokens that match exactly and where the max number of extra tokens between the current match an the previous is 1, 2, or 3.

In example 2 above, for the FLOWER match, the previous match is BOBS. There are no extra tokens in the first string and 1 in the second so, this would be an example of $Ran_{Dist-1}$.

If the strings, BOBS PRETTY FLOWERS and BOBS GOOD FLOWERS are compared, the distance for the exact match FLOWERS, would still be 1, since there is one extra token in each string.

If the strings, BOBS PRETTY NICE FLOWERS and BOBS GOOD FLOWERS are compared, the distance for the exact match FLOWERS, would be 2, since there are 2 extra tokens in the first sting.

If the number of extra tokens is greater than or equal to 3, it is counted in $Ran_{Dist-3}$.

The following frequencies can then be computed:

$$RanProb_{Exact}=Ran_{Exact}/Ran_{Comp}$$

$$RanProb_{Initial}=Ran_{Initial}/Ran_{Comp}$$

$$RanProb_{Phonetic}=Ran_{Phonetic}/Ran_{Comp}$$

$$RanProb_{Nickname}=Ran_{Nickname}/Ran_{Comp}$$

$$RanProb_{NickPhone}=Ran_{NickPhone}/Ran_{Comp}$$

$$RanProb_{Edit}=Ran_{Edit}/Ran_{Comp}$$

$$RanProb_{Dist-0}=Ran_{Dist-0}/Ran_{Comp}$$

$$RanProb_{Dist-1}=Ran_{Dist-1}/Ran_{Comp}$$

$$RanProb_{Dist-2}=Ran_{Dist-2}/Ran_{Comp}$$

$$RanProb_{Dist-3}=Ran_{Dist-3}/Ran_{Comp}$$

Using the process described above in conjunction with generating exact match weights, a set of matched name pairs can be derived, and the following frequencies derived:

$$MatchProb_{Exact}=Match_{Exact}/Match_{Comp}$$

$$MatchProb_{Initial}=Match_{Initial}/Match_{Comp}$$

$$MatchProb_{Phonetic}=Match_{Phonetic}/Match_{Comp}$$

$$MatchProb_{Nickname}=Match_{Nickname}/Match_{Comp}$$

$$MatchProb_{NickPhone}=Match_{NickPhone}/Match_{Comp}$$

$$MatchProb_{Edit}=Match_{Edit}/Match_{Comp}$$

$$MatchProb_{Dist-0}=Match_{Dist-0}/Match_{Comp}$$

$$MatchProb_{Dist-1}=Match_{Dist-1}/Match_{Comp}$$

$$MatchProb_{Dist-2}=Match_{Dist-2}/Match_{Comp}$$

$$MatchProb_{Dist-3}=Match_{Dist-3}/Match_{Comp}$$

Using these frequencies the following marginal weights may be computed:

$$Marginal_{Exact}=\log_{10}(MatchProb_{Exact}/RanProb_{Exact})$$

$$Marginal_{Initial}=\log_{10}(MatchProb_{Initial}/RanProb_{Initial})$$

$$Marginal_{Phonetic}=\log_{10}(MatchProb_{Phonetic}/RanProb_{Phonetic})$$

$$Marginal_{Nickname}=\log_{10}(MatchProb_{Nickname}/RanProb_{Nickname})$$

$$Marginal_{NickPhone}=\log_{10}(MatchProb_{NickPhone}/RanProb_{NickPhone})$$

$$Marginal_{Edit}=\log_{10}(MatchProb_{Edit}/RanProb_{Edit})$$

$$Marginal_{Dist-0}=\log_{10}(MatchProb_{Dist-0}/RanProb_{Dist-0})$$

$$Marginal_{Dist-1}=\log_{10}(MatchProb_{Dist-1}/RanProb_{Dist-1})$$

$$Marginal_{Dist-2}=\log_{10}(MatchProb_{Dist-2}/RanProb_{Dist-2})$$

$$Marginal_{Dist-3}=\log_{10}(MatchProb_{Dist-3}/RanProb_{Dist-3})$$

and the respective penalties computed as follows:

$$\text{Initial Penalty}=Marginal_{Exact}-Marginal_{Initial}$$

$$\text{Initial Penalty}=Marginal_{Exact}-Marginal_{Initial}$$

$$\text{Phonetic Penalty}=Marginal_{Exact}-Marginal_{Phonetic}$$

$$\text{Nickname Penalty}=Marginal_{Exact}-Marginal_{Nickname}$$

$$\text{NickPhone Penalty}=Marginal_{Exact}-Marginal_{NickPhone}$$

$$\text{Edit Distance Penalty}=Marginal_{Exact}-Marginal_{Edit}$$

$$DistPenalty_1=Marginal_{Dist-1}-Marginal_{Dist-1}$$

$$DistPenalty_2=Marginal_{Dist-0}-Marginal_{Dist-2}$$

$$DistPenalty_3=Marginal_{Dist-0}-Marginal_{Dist-3}$$

An example of the application of embodiments of the systems and methods of the present invention to two actual names may now be illustrated with respect to the example table of FIG. 7 to further aid in the understanding of these systems and methods. Assume that it is desired to obtain a weight between two names: "Bobs Flower Shop" and "Bobs Very Pretty Flower Shoppe" and that the following parameters are to be used for the comparison, the exact match weights for each of the tokens is:

BOBS—200
VERY—150
PRETTY—300
FLOWER—400
SHOPPE—600
SHOP—150

While the distance penalty for a distance of 3 is 100 and a phonetic penalty is 100.

In accordance with one embodiment of the systems and methods of the present invention an average information score may be calculated for the two names being compared (step 430). In one embodiment, this is done using the exact match weights for each of the tokens in each of the names. According to this method, the information score for Bobs Flower Shop is 750 (e.g. 200+400+150) and the information score for the name "Bobs Very Pretty Flower Shoppe" is 1650 (200+150+300+400+600), making the average of the two information scores 1200.

Once an average information score for the two names is computed (step 430) a weight for the two names may be generated (step 440). In one embodiment, table 700 is constructed (step 510). Where each cell 702 has the ability to keep a position indicator (e.g. row, column) and a cell weight. Cells 702*a* of the table may then be initialized (step 520).

Once cells 702*a* of the table have been initialized, the remainder of the cells 702 of the table 700 may be iterated through. Starting with cell 702*b* (e.g. row 1, column 1), it is determined that a match occurs between the two tokens corresponding to the cell 702*b* (step 540). The match weight for these two tokens may then be calculated (step 542), which in this case is 200. The cell weight values for adjoining cells may then be determined (steps 610, 620), and from this it can be determined that the cell weight (0) from the diagonal cell 702*a*1 plus 200 (e.g. temporary cell weight for the cell) is greater than the cell weight of either adjoining cell 702*a*2, 702*a*3 (step 640). Thus, the last match position indicator of cell 702*b* is set to the current cell 702*b* (1,1) and the cell weight of the current cell is set to the calculated match weight (200) (steps 642, 644).

The last match position indicator and cell weight for the next cell 702*c* may then be calculated. It is determined that no match occurs between the two tokens corresponding to the cell 702*c* (step 540). As no acronym match occurs (step 532) the match weight for this cell is then set to zero (step 543). A temporary cell weight may then be calculated (step 630) and compared to the cell weights of adjoining cells 702*b*, 702*a*4 (steps 640, 650) and from this it can be determined that the cell weight (100) from the adjoining cell 702*b* is greater than the cell weight of adjoining cell 702*a*4 or the cell weight of diagonal cell 702*a*3 plus the match weight for the current cell (0) (e.g. temporary cell weight). Thus, the last match position indicator of current cell 702*c* is set to the last match position indicator of adjoining cell 702*b* (1,1) and the cell weight of the current cell 702*c* is set to the cell weight of the adjoining cell 702*b* with the greater cell weight (step 652)

Similarly cells 702*d*, 702*e*, 702*f*, 702*g*, 702*h*, 702*i*, 702*j* and 702*k* may be iterated through with similar results as those described above with respect to cell 702*c*. Upon reaching cell 702*l*, however, it may be determined that a match occurs between the two tokens corresponding to the cell 702*l* (step 540). The match weight for the tokens corresponding to cell 702*l* (e.g. "Flower" and "Flower") may then be calculated (step 542), which in this case may be 400. It may then be determined if a distance penalty should be imposed by comparing the position of the last match position of the diagonal cell 702*h* with the position of the current cell 702*l* (step 550). This comparison may be accomplished by subtracting the row indices from one another (e.g. 4—1) and the column indices from one another (e.g. 2—1) and taking the maximum of these values (e.g. 3) and comparing this distance value to a threshold level to determine if a distance penalty should be imposed. In this case the threshold value for a distance penalty may be a distance of one, as three is greater than one it may be determined that a distance penalty should be imposed. The distance penalty corresponding to the distance value (e.g. 3) may then be subtracted from the calculated match weight for the current cell (steps 552, 560). In this case, the distance penalty is 100, which may be subtracted from the match weight of 400 to adjust the match weight of cell 702*l* to 300. The cell weight values for adjoining cells may then be determined, and from this it can be determined that the cell weight (200) from the diagonal cell 702*h* plus the match weight for the current cell 702*l* (e.g. 300) is greater than the cell weight of either adjoining cell 702*k*, 702*i* (e.g. 200 and 200 respectively) (step 640). Thus, the last match position indicator of cell 702*l* is set to the current cell 702*l* (4,2) and the cell weight of the current cell 702*l* is set to the calculated match weight plus the cell weight from the diagonal cell 702*h* (e.g. 300+200=500) (steps 642, 644).

The last position match indicator and cell weights for cells 702*m*, 702*n* and 702*o* may be calculated similarly to the calculations described above. Upon reaching cell 702*p*, however, it may be determined that a match occurs between the two tokens corresponding to the cell 702*p* (step 540). The match weight for the tokens corresponding to cell 702*p* (e.g. "Shoppe" and "Shop") may then be calculated (step 542), which in this case may be 50 (as the match between "Shoppe" and "Shop" may be a phonetic match its weight may be the minimum of the exact match weights for Shoppe and Shop minus the phonetic penalty weight). It may then be determined if a distance penalty should be imposed by comparing the position of the last match position of the diagonal cell 702*l* with the position of the current cell 702*p* (step 550). This comparison may be accomplished by subtracting the row indices from one another (e.g. 5—4) and the column indices from one/another (3—2) and taking the maximum of these values (e.g. 1) and comparing this distance value to a threshold level to determine if a distance penalty should be imposed. In this case the threshold value for a distance penalty may be a distance of one and as such a distance penalty should not be imposed. Thus, the match weight of the current cell 702*p* is 50. The cell weight values for adjoining cells 702*o*, 702*m* may then be determined (steps 610, 620), and from this it can be determined that the cell weight from the diagonal cell 702*l* (500) plus the match weight for the current cell 702*p* (50) is greater than the cell weight of either adjoining cell 702*k*, 702*i* (e.g. 500 and 500 respectively) (step 640). Thus, the last match position indicator of cell 702*p* is set to the current cell 702*p* (5,3) and the cell weight of the current cell 702*p* is set to the calculated match weight plus the cell weight from the diagonal cell 702*l* (e.g. 500+50=550) (steps 642, 644).

Reading the last cell 702*p* of table 700 it can be determined that the weight for the two names being compared is 550. This weight may then be normalized according to a maximum similarity index and a ratio of the weight to an average information score for the two names (step 450). For example, if the maximum similarity index is 10, the weight may be normalized to a normalized index value of 4 by rounding the results of the equation 10*550/1200. This normalized index value may be used as index into a normalized weight table to generate the final weight for the two tokens (step 450). For example, the normalized weight of 4 may index to a final weight of 441 for the two names.

To further aid in an understanding of embodiments of the systems and methods of the present invention it may be useful to illustrate an example of the application of embodiments of the systems and methods of the present invention to a comparison of names where an acronym is present in one of the two names being compared. A table for use in illustrating such an example is depicted in FIG. 8. Assume that it is desired to obtain a weight between two names: "Bobs VP Flower Shop" and "Bobs Very Pretty Flower Shop" and that the following parameters are to be used for the comparison, the exact match weights for each of the tokens is:

BOBS—200
VERY—150
PRETTY—300
FLOWER—400
SHOP—150

While the distance penalty for a distance of 3 is 100.

In accordance with one embodiment of the systems and methods of the present invention an average information score may be calculated for the two names being compared (step 430). In one embodiment, this is done using the exact match weights for each of the tokens in each of the names. According to this method, the information score for Bobs VP Flower Shop is 1050 (e.g. 200+300400+150) and the information score for the name "Bobs Very Pretty Flower Shop" is 1200 (200+150+300+400+150), making the average of the two information scores 1125.

Once an average information score for the two names is computed (step 430) a weight for the two names may be generated (step 440). In one embodiment, table 800 is constructed (step 510). Where each cell 802 has the ability to keep a position indicator (e.g. row, column) and a cell weight. Cells 802*a* of the table may then be initialized (step 520).

Once cells 802*a* of the table have been initialized, the remainder of the cells 802 of the table 800 may be iterated through. Starting with cell 802*b* (e.g. row 1, column 1), it is determined that a match occurs between the two tokens corresponding to the cell 802*b* (step 540). The match weight for these two tokens may then be calculated (step 542), which in this case is 200. The cell weight values for adjoining cells may then be determined (steps 610, 620), and from this it can be determined that the cell weight (0) from the diagonal cell 802*a*1 plus 200 (e.g. temporary cell weight for the cell) is greater than the cell weight of either adjoining cell 802*a*2, 802*a*3 (step 640). Thus, the last match position indicator of cell 802*b* is set to the current cell 802*b* (1,1) and the cell weight of the current cell 802*b* is set to the calculated match weight (200) (steps 642, 644).

Cells 802*c*-802*f* may similarly be iterated through, as discussed above. Upon reaching cell 802*g* it may be determined that no match exists between the two tokens corresponding to cell 802*g* (step 540), however, it may be determined that VP is acronym (step 532). This determination may be accomplished by comparing the first character of a first token "VP" corresponding to cell 802*g* (e.g. "V") to the first character of the other token corresponding to cell 802*g* (e.g. very). As the character "V" matches the first character of the token "Very", the next character of the token "VP" (e.g. "P") is compared to the following token in the other name (e.g. "Pretty") as these characters match, and there are no more characters of the first token (e.g. "VP"), it can be determined that the token "VP" is an acronym and values can be computed for the set of cells 802*g*, 802*k* corresponding to the acronym token (e.g. each cell which corresponds to one character of the acronym token and a token of the other name) similarly to the computation discussed above (in the example depicted with respect to FIG. 8A, both the matches between the characters of the acronym (e.g. "V" and "P") and their respective matching tokens (e.g. "Very" and "Pretty") generate an initial match with a weight of 50). After values are computer for the cells 802*g* and 802*k* the table may resemble that depicted in FIG. 8A.

The rest of the cells 802 of table 800 may then be iterated through beginning with cell 802*d* to calculate last position matches and cell weights for these cells as described above. Cells 802*g* and 802*k* may be skipped during this iterative process as these cells have already been matched via an acronym (step 530). After iterating through the remainder of cells 802 of table 800, table 800 may resemble the table depicted in FIG. 8B.

Reading the last cell 802*u* of table 800 it can be determined that the weight for the two names being compared is 850. This weight may then be normalized according to a maximum similarity index and a ratio of the weight to an average information score for the two names (step 450). For example, if the maximum similarity index is 10, the weight may be normalized to a normalized index value of 8 by rounding the results of the equation 10*850/1125. This normalized index value may be used as index into a normalized weight table to generate the final weight for the two tokens (step 450). For example, the normalized weight of 8 may index to a final weight of 520 for the two names.

Pseudocode describing one embodiment of a method for comparing names is presented below to further help in the comprehension of embodiments of the present invention:

```
Compare(tList1, tList2) // tList1 and tlist2 are lists of tokens
  L1 = len(tList1)
  L2 = len(tList2)
  compareTable = a 2 dim-array indexed 0...L1 and 0...L2 containing
  real numbers.
  Set all entries in row 0 to 0.0 and None
  Set all entries in column 0 to 0.0 and None
  For r in range(1...L1)
    For c in range(1..L2)
      tokenInfo, compareResult = compare(tList1[r], tList2[c])
      if the compareResult was a match (exact or partial):
        get I_MATCH and J_MATCH from compareTable[r−1][c−1]
        maxDiff = max(r − I_MATCH, c − J_MATCH)
        if maxDiff > 1:
          //need to apply the distance penalty.
          penalty = posPenalty[maxDiff]
        else
          penalty = 0.0
        diagonalContent =
          compareTable[r−1][c−
  1].infoScore+tokenInfo − penalty
          compareTable[r][c]. infoScore = max(compareTable[r−
  1][c].infoScore,
            compareTable[r][c−1]. infoScore,
              compareTable[r][c]. infoScore) +
  tokenInfo)
          if new infoScore is result of new match:
            compareTable[r][c].I_MATCH = r
            compareTable[r][c].J_MATCH = c
          elsif new info score comes from [r, c−1] or [r−1, c]
            compare I_MATCH, J_MATCH from that cell
          else if acronymCheck(tList1[r], tList2, c) or
  acronymCheck(tList2[c], tList1, c)
            L = length of acronym
            for i in range(0, L−1)
              compareTable[r+i, c+i].I_Match = r+L
              compareTable[r+i,c+i].J_Match = c+L
              compareTable[r+i,c+i].infoScore =
  max(compareTable[r−1][c].infoScore,
                compareTable[r][c−1].
  infoScore,
                  compareTable[r][c]. infoScore) +
  acronymScore
          else: //compare results was not a match
            compareTable[r][c].infoScore = max(
              compareTable[r−1][c−1]
  ].infoScore,
                compareTable[r][c−1]
  ].infoScore,
                  compareTable[r][c] ].infoScore)
          update compareTable[r][c].I_MATCH and J_MATCH
          using contents of appropriate cell: either [r−1, c−1], [r, c−1]
          or [r−1, c].
  maxInfo = max(tokenListInfo(tList1), tokenListInfo(tList2))
  normalizedInfo = 10 * round(compareTable[L1][L2]/maxInfo)
  return normalizedInfo
```

The normalized index value which may be returned by the embodiment of the present invention described in the pseudocode above may be used to index a table of values to obtain a final weight, as described above. Such a table may resemble the following, where the maximum index value may be 16:

NORM_ADJWGT_0|−185|
NORM_ADJWGT_1|−101|
NORM_ADJWGT_2|−53|
NORM_ADJWGT_3|−12|
NORM_ADJWGT_4|37|
NORM_ADJWGT_5|69|
NORM_ADJWGT_6|142|
NORM_ADJWGT_7|207|
NORM_ADJWGT_8|261|
NORM_ADJWGT_9|280|
NORM_ADJWGT_10|277|
NORM_ADJWGT_11|309|
NORM_ADJWGT_12|360|
NORM_ADJWGT_13|452|
NORM_ADJWGT_14|477|
NORM_ADJWGT_15|564|
NORM_ADJWGT_16|598|

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method for comparing attributes, comprising:
providing a system having an identity hub coupled to a set of data sources and a set of operator computers via a network, wherein the identity hub is configured to store a link between one or more data records in the set of data sources;
receiving, at the identity hub, a first attribute comprising a first set of tokens from one of the set of data sources or from one of the set of operators, wherein the first attribute is associated with a first data record in one of the set of data sources and represents a first entity;
receiving, at the identity hub, a second attribute comprising a second set of tokens from one of the set of data sources, wherein the second attribute is associated with a second data record in one of the data sources and represents a second entity;
comparing, at the identity hub, the first set of tokens of the first attribute to the second set of tokens of the second attribute and generating a weight for the first attribute and the second attribute based on match weights associated with matching tokens between the first and second sets of tokens, wherein generating the weight comprises adjusting the match weight associated with current matching tokens within the first and second sets of tokens based on match weights determined from a comparison including one or more prior tokens within the first and second sets of tokens; and
determining if the first data record and the second data record correspond to the same entity and should be linked based at least in part on the weight between the two attributes.

2. The method of claim 1, further comprising normalizing the weight by applying a scaling factor.

3. The method of claim 2, further comprising calculating an overall information score for the first attribute and the second attribute.

4. The method of claim 3, wherein the information score is the average of a first information score for the first attribute and a second information score for the second attribute.

5. The method of claim 4, wherein the first information score is a sum of a first set of exact match weights for the first attribute, each of the first set of exact match weights corresponding to one of the first set of tokens and the second information score is a sum of a second set of exact match weights for the second attribute, each of the second set of exact match weights corresponding to one of the second set of tokens.

6. The method of claim 3, wherein the scaling factor is applied to a ratio of the weight to the overall information score to generate a normalized index value.

7. The method of claim 6, further comprising using the normalized index value as an index into a table to determine a final weight for the comparison of the two attributes and setting the weight to the final weight.

8. The method of claim 1, wherein generating the weight further comprises:
determining, at the identity hub, a current match weight for a pair of tokens;
determining, at the identity hub, a first previous match weight corresponding to the pair of tokens;
determining, at the identity hub, a second previous match weight corresponding to the pair of tokens;
setting, at the identity hub, the weight to the current match weight if the current match weight is greater than the first previous match weight or the second previous match weight; and
setting, at the identity hub, the weight to the greater of the first previous match weight or the second previous match weight if either the first previous match weight or the second previous match weight is greater than the current match weight.

9. A computer readable storage medium, comprising instructions executable by a processor for:
receiving a first attribute comprising a first set of tokens from one of a set of data sources or from one of a set of operators, wherein the first attribute is associated with a first data record in one of the set of data sources and represents a first entity;
receiving a second attribute comprising a second set of tokens from one of the set of data sources, wherein the second attribute is associated with a second data record in one of the data sources and represents a second entity;
comparing the first set of tokens of the first attribute to the second set of tokens of the second attribute and generating a weight for the first attribute and the second attribute based on match weights associated with matching tokens between the first and second sets of tokens, wherein generating the weight comprises adjusting the match weight associated with current matching tokens within the first and second sets of tokens based on match weights determined from a comparison including one or more prior tokens within the first and second sets of tokens; and
determining if the first data record and the second data record correspond to the same entity and should be linked based at least in part on the weight between the two attributes.

10. The computer readable medium of claim 9, the instructions further executable for normalizing the weight by applying a scaling factor.

11. The computer readable medium of claim 10, the instructions further executable for calculating an overall information score for the first attribute and the second attribute.

12. The computer readable medium of claim 11, wherein the information score is the average of a first information score for the first attribute and a second information score for the second attribute.

13. The computer readable medium of claim 12, wherein the first information score is a sum of a first set of exact match weights for the first attribute, each of the first set of exact match weights corresponding to one of the first set of tokens and the second information score is a sum of a second set of exact match weights for the second attribute, each of the second set of exact match weights corresponding to one of the second set of tokens.

14. The computer readable medium of claim 11, wherein the scaling factor is applied to a ratio of the weight to the overall information score to generate a normalized index value.

15. The computer readable medium of claim 14, the instructions further executable for using the normalized index value as an index into a table to determine a final weight for the comparison of the two attributes and setting the weight to the final weight.

16. The computer readable medium of claim 9, wherein generating the weight further comprises:
   determining a current match weight for a pair of tokens;
   determining a first previous match weight corresponding to the pair of tokens;
   determining a second previous match weight corresponding to the pair of tokens;
   setting the weight to the current match weight if the current match weight is greater than the first previous match weight or the second previous match weight; and
   setting the weight to the greater of the first previous match weight or the second previous match weight if either the first previous match weight or the second previous match weight is greater than the current match weight.

17. A system for comparing attributes, comprising:
   a set of operator computers;
   a set of data sources, each data source storing one or more data records; and
   an identity hub coupled to the set of data sources and the set of operator computers via a network, the identity hub configured to store links between one or more data records in the set of data sources, wherein the identity hub comprises a tangible computer readable medium comprising instructions executable by a processor for:
      receiving a first attribute comprising a first set of tokens from one of a set of data sources or from one of a set of operators, wherein the first attribute is associated with a first data record in one of the set of data sources and represents a first entity;
      receiving a second attribute comprising a second set of tokens from one of the set of data sources, wherein the second attribute is associated with a second data record in one of the data sources and represents a second entity;
      comparing the first set of tokens of the first attribute to the second set of tokens of the second attribute and generating a weight for the first attribute and the second attribute based on match weights associated with matching tokens between the first and second sets of tokens, wherein generating the weight comprises adjusting the match weight associated with current matching tokens within the first and second sets of tokens based on match weights determined from a comparison including one or more prior tokens within the first and second sets of tokens; and
      determining if the first data record and the second data record correspond to the same entity and should be linked based at least in part on the weight between the two attributes.

18. The system of claim 17, the instructions further executable for normalizing the weight by applying a scaling factor.

19. The system of claim 18, the instructions further executable for calculating an overall information score for the first attribute and the second attribute.

20. The system of claim 19, wherein the information score is the average of a first information score for the first attribute and a second information score for the second attribute.

21. The system of claim 20, wherein the first information score is a sum of a first set of exact match weights for the first attribute, each of the first set of exact match weights corresponding to one of the first set of tokens and the second information score is a sum of a second set of exact match weights for the second attribute, each of the second set of exact match weights corresponding to one of the second set of tokens.

22. The system of claim 19, wherein the scaling factor is applied to a ratio of the weight to the overall information score to generate a normalized index value.

23. The system of claim 22, the instructions further executable for using the normalized index value as an index into a table to determine a final weight for the comparison of the two attributes and setting the weight to the final weight.

24. The system of claim 17, wherein generating the weight further comprises:
   determining a current match weight for a pair of tokens;
   determining a first previous match weight corresponding to the pair of tokens;
   determining a second previous match weight corresponding to the pair of tokens;
   setting the weight to the current match weight if the current match weight is greater than the first previous match weight or the second previous match weight; and
   setting the weight to the greater of the first previous match weight or the second previous match weight if either the first previous match weight or the second previous match weight is greater than the current match weight.

* * * * *